(12) United States Patent
Aykut et al.

(10) Patent No.: US 12,455,918 B2
(45) Date of Patent: *Oct. 28, 2025

(54) MODEL-BASED ATTRIBUTION FOR CONTENT GENERATED BY AN ARTIFICIAL INTELLIGENCE (AI)

(71) Applicant: Sureel Inc., Pacifica, CA (US)

(72) Inventors: Tamay Aykut, Pacifica, CA (US); Christopher Benjamin Kuhn, Munich (DE)

(73) Assignee: Sureel Inc., Pacifica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,223

(22) Filed: May 1, 2024

(65) Prior Publication Data

US 2024/0281463 A1    Aug. 22, 2024

Related U.S. Application Data

(63) Continuation of application No. 18/384,899, filed on Oct. 30, 2023, now Pat. No. 12,013,891, which is a continuation of application No. 18/242,898, filed on Sep. 6, 2023, now Pat. No. 12,314,308, which is a continuation of application No. 18/231,551, filed on Aug. 8, 2023.

(60) Provisional application No. 63/521,066, filed on Jun. 14, 2023, provisional application No. 63/422,885, filed on Nov. 4, 2022.

(51) Int. Cl.
*G06F 16/45* (2019.01)
*G06F 16/438* (2019.01)
*G06N 3/0455* (2023.01)
*G06N 3/0475* (2023.01)
*G06Q 30/0208* (2023.01)

(52) U.S. Cl.
CPC ............ *G06F 16/45* (2019.01); *G06F 16/438* (2019.01); *G06N 3/0455* (2023.01); *G06N 3/0475* (2023.01); *G06Q 30/0208* (2013.01)

(58) Field of Classification Search
CPC ............................. G06F 16/45; G06F 16/438
USPC ....................................................... 707/736
See application file for complete search history.

(56) References Cited

U.S. PATENT DOCUMENTS 10,599,770 B1 * 3/2020 Strope .................. G06F 40/289
11,922,550 B1 * 3/2024 Ramesh ............... G06F 40/284
(Continued)

*Primary Examiner* — Kimberly L Wilson
(74) *Attorney, Agent, or Firm* — Flagship Patents; Shiv S. Naimpally

(57) ABSTRACT

In some aspects, a server, after determining that a training of an artificial intelligence has been completed to create a trained artificial intelligence, determines an attribution vector created during the training of the artificial intelligence, determines that the trained artificial intelligence has received an input, and generates, using the trained artificial intelligence, an output based on the input. The server determines an attribution determination for individual content creators of multiple content creators based on the attribution vector and based on identifying one or more of the creators that contributed at least a threshold amount during the training. A particular creator having a contribution less than the threshold amount does not receive a creator attribution. The server initiates providing compensation to one or more of the multiple content creators based at least in part on the attribution determination.

20 Claims, 10 Drawing Sheets

(56) References Cited

U.S. PATENT DOCUMENTS

| | | | |
|---|---|---|---|
| 2020/0034442 A1* | 1/2020 | Larson | G06Q 10/101 |
| 2021/0117759 A1* | 4/2021 | David | G06N 3/048 |
| 2022/0043965 A1* | 2/2022 | Dvorak | G06F 40/103 |
| 2022/0350828 A1* | 11/2022 | Ma | G06F 16/3347 |
| 2023/0075884 A1* | 3/2023 | Jakobsson | H04L 9/50 |
| 2023/0360300 A1* | 11/2023 | De Brouwer | G06F 21/16 |
| 2023/0401550 A1* | 12/2023 | Mikolajczuk | G06Q 20/123 |
| 2024/0193821 A1* | 6/2024 | Denison | G06F 40/40 |
| 2024/0281504 A1* | 8/2024 | Collomosse | H04L 9/3247 |
| 2024/0354498 A1* | 10/2024 | Prasad | G06F 40/20 |

* cited by examiner

MODEL-BASED ATTRIBUTION FOR CONTENT GENERATED BY AN ARTIFICIAL INTELLIGENCE (AI)

CROSS-REFERENCE TO RELATED APPLICATIONS

The present patent application is a continuation-in-part of U.S. patent application Ser. No. 18/384,899, filed on Oct. 30, 2023, entitled "MODEL-BASED ATTRIBUTION FOR CONTENT GENERATED BY AN ARTIFICIAL INTELLIGENCE (AI)" which is incorporated by reference herein in its entirety and for all purposes as if completely and fully set forth herein.

BACKGROUND OF THE INVENTION

Field of the Invention

This invention relates generally to systems and techniques to determine the proportion of content items used by a generative artificial intelligence (e.g., Latent Diffusion Model or similar) to generate derivative content, thereby enabling attribution (and compensation) to content creators that created the content items used to train the generative artificial intelligence to generate the derivative content.

Description of the Related Art

Generative artificial intelligence (AI) enables anyone (content creators and non-content creators) to instruct the AI to create derivative content that is similar to (e.g., shares one or more characteristics with) (1) content that was used to train the AI, (2) content used by the AI to create the new content, or (3) both. For example, if someone requests that the AI generate an image of a particular animal (e.g., a tiger) and if they specify a particular style (e.g., in the style of a particular artist), then the AI may generate derivative content based on (1) drawings and/or photographs of the particular animal and (2) drawings in the particular style (e.g., of the particular artist). Currently, there are no techniques to determine the proportionality of the content that the AI used to generate the derivative content and therefore no mechanism to provide attribution (and compensation) to the content creators that created the content used by the AI to generate the derivative content.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a server, after determining that a training of an artificial intelligence has been completed to create a trained artificial intelligence, determines an attribution vector created during the training of the artificial intelligence, determines that the trained artificial intelligence has received an input, and generates, using the trained artificial intelligence, an output based on the input. The server determines an attribution determination for individual content creators of multiple content creators based on the attribution vector and based on identifying one or more of the creators that contributed at least a threshold amount during the training. A particular creator having a contribution less than the threshold amount does not receive a creator attribution. The server initiates providing compensation to one or more of the multiple content creators based at least in part on the attribution determination. Training the artificial intelligence to create the trained artificial intelligence includes: selecting a content creator from multiple content creators to create a selected content creator, selecting a plurality of content items associated with the selected content creator to create selected content items, training the artificial intelligence using the selected content items, determining a measure of a proximity between: (i) the artificial intelligence trained using the selected content items and (ii) the artificial intelligence prior to initiating the training, determining a creator influence of the content creator on the trained artificial intelligence based at least in part on the measure of the proximity, and including the creator influence in an attribution vector.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
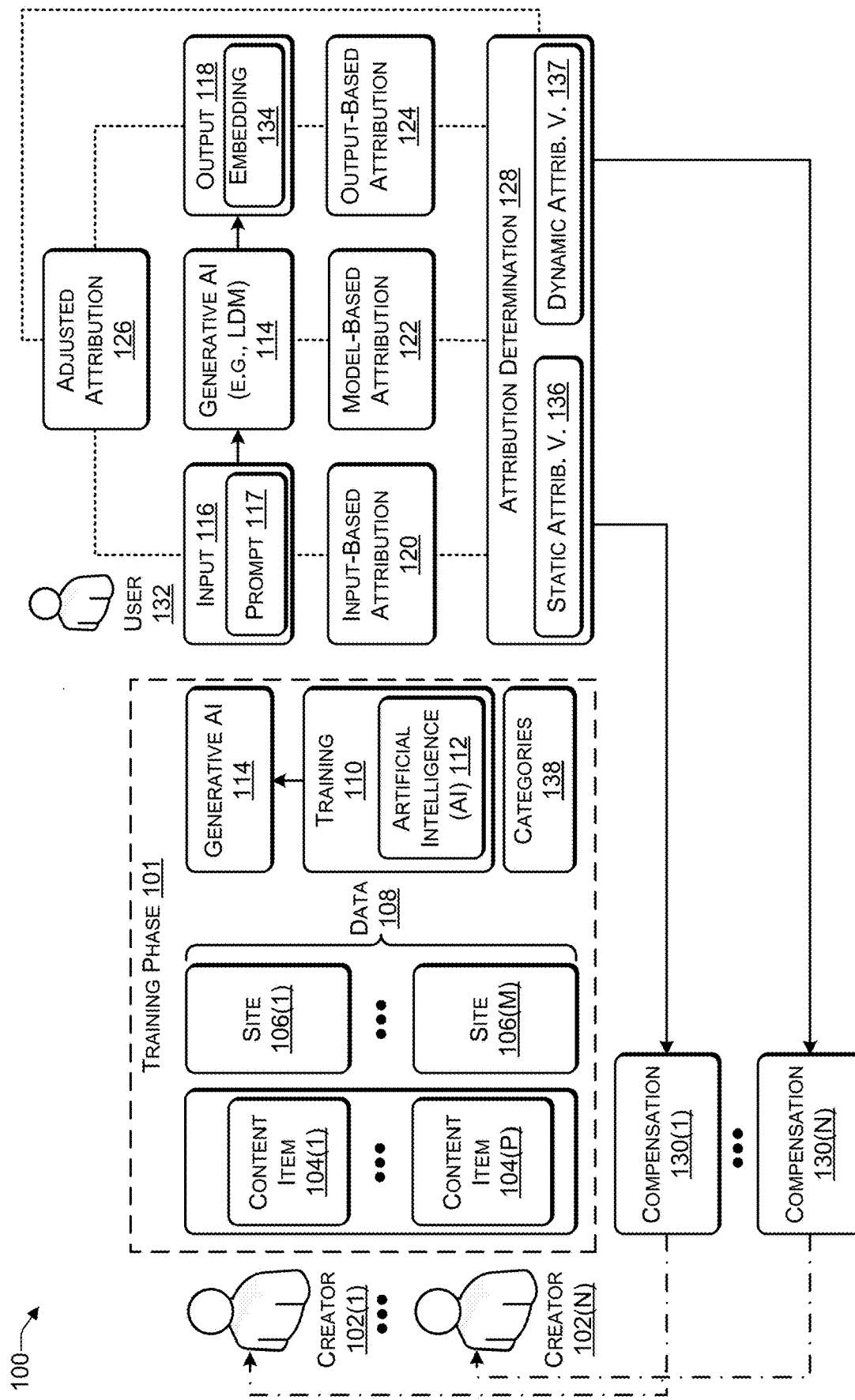
FIG. 1 is a block diagram of a system illustrating different ways to determine a attribution of an output produced by a generative artificial intelligence (AI), according to some embodiments.

With conventional art (e.g., paintings), the term provenance refers to authenticating a work of art by establishing the history of ownership. More broadly, provenance is a set of facts that link the work of art to its creator and explicitly describe the work of art including, for example, a title of the work of art, a name of the creator (e.g., artist), a date of creation, medium (e.g., oil, watercolor, or the like), dimensions, and the like. Generative artificial intelligence (AI), implemented using, for example, a diffusion model or similar AI, may be used to generate digital content. For example, a user (e.g., a secondary creator) may input a text description of the desired digital content to the AI and the AI may generate an output. To illustrate, the input "create a painting of a lion in the style of Picasso" may result in the generative AI creating a digital image that is derived from a photograph or painting of a lion and from the paintings of artist Pablo Picasso. The term provenance, as used herein, is with reference to digital content generated by an AI and includes attribution to one or more content creators (e.g., Picasso). The attribution and other provenance-related information may be stored in a blockchain to provide decentralized tracking of the provenance (as described in U.S. Provisional Application 63/422,885).

Terminology

Creator refers to a provider of original content ("content provider"), e.g., content used to train (e.g., fine tune or further train) the generative AI to encourage an "opt-in" mentality. By opting in to allow their original content to be used to train and/or re-train the generative AI, each of the creators receive attribution (and possibly compensation) for derivative content created by the generative AI that has been influenced by the original content of the creators.

User (e.g., a secondary creator) refers to an end user of the generative AI that generates derivative content using the generative AI.

Category refers to various characteristics of a content item, either original content or derivative content. For example, categories associated with a work of art may include (1) material applied to a medium, such as pencil (color or monochrome), oil, watercolor, charcoal, mixed materials, or the like, (2) the medium, such as paper, canvas, wood, or the like, (3) the instrument used to apply the material to the medium, such as a brush, a finger, a palette knife, or the like, (4) style, such as renaissance, modern, romanticism, neo-classical, hyper-realism, pop art, or the like, and so on.

Content item refers to original content created by a creator.

Derivative content refers to output produced by a generative AI in response to input provided by a user.

Embedding refers to a matrix (or a vector) of numbers. An embedding may be used to describe something in terms of other things. For example, derivative content created by a generative AI may include an output embedding that describes the output in terms of creators, content items, categories (e.g., characteristics), or any combination thereof.

The systems and techniques described herein may be applied to any type of generative AI models, including (but not limited to) diffusion models, generative adversarial network (GAN) models, Generative Pre-Trained Transformer (GPT) models, or other types of generative AI models. For illustration purposes, a diffusion model is used as an example of a generative AI. However, it should be understood that the systems and techniques described herein may be applied to other types of generative AI models. A diffusion model is a generative model used to output (e.g., generate) data similar to the training data used to train the generative model. A diffusion model works by destroying training data through the successive addition of Gaussian noise, and then learns to recover the data by reversing the noise process. After training, the diffusion model may generate data by passing randomly sampled noise through the learned denoising process. In technical terms, a diffusion model is a latent variable model which maps to the latent space using, for example, a fixed Markov chain (or another similar mapping). This chain gradually adds noise to the data in order to obtain the approximate posterior $q(x1:T|x0)$, where $x1, \ldots, xT$ are latent variables with the same dimensions as $x0$.

A latent diffusion model (LDM) is a specific type of diffusion model that uses an auto-encoder to map between image space and latent space. The diffusion model works on the latent space, making it easier to train. The LDM includes (1) an auto-encoder, (2) a U-net with attention, and (3) a Contrastive Language Image Pretraining (CLIP) embeddings generator. The auto-encoder maps between image space and latent space. In terms of image segmentation, attention refers to highlighting relevant activations during training. By doing this, computational resources are not wasted on irrelevant activations, thereby providing the network with better generalization power. In this way, the network is able to pay "attention" to certain parts of the image. A CLIP encoder may be used for a range of visual tasks, including classification, detection, captioning, and image manipulation. A CLIP encoder may capture semantic information about input observations. CLIP is an efficient method of image representation learning that uses natural language supervision. CLIP jointly trains an image encoder and a text encoder to predict the correct pairings of a batch of (image, text) training examples. The trained text encoder synthesizes a zero-shot linear classifier by embedding the names or descriptions of the target dataset's classes. For pre-training, CLIP is trained to predict which possible (image, text) pairings actually occurred. CLIP learns a multi-modal embedding space by jointly training an image encoder and text encoder to maximize the cosine similarity of the image and text embeddings of the real pairs in the batch while minimizing the cosine similarity of the embeddings of the incorrect pairings.

A generative AI may be initially trained using open-source data to create a pre-trained (also referred to as a base) AI. The pre-trained AI ("AI") is subsequently trained using training data to create a trained AI (e.g., a generative AI to generate a particular type of content). For example, to create a generative AI that produces digital images in the style of Renaissance artists, the AI may be trained using content items (e.g., digital images of art) created by artists that produced art during the Renaissance period (between approximately 1350 to 1620 AD). As another example, to create a generative AI that produces digital audio in the style of rhythm and blues (R&B) artists in the 1960s, 1970s, and 1980s, the AI may be trained using content items (e.g., digital audio items) created by musicians in the 1960s, 1970s, and 1980s.

The model-based attribution has both an offline phase (e.g., training phase) and an online phase (e.g., generative phase). During the offline phase, a pre-computed attribution model is determined when the pre-trained AI is being trained. During training, the effect of a particular content item on the neural pathways of the neural network of the pre-trained AI may be determined and stored. After the training is complete, the influence of each content creator (that created the content items used to train the AI) may be determined by aggregating the influence of their respective content items on the AI during training. Thus, the influence of content creator XYZ on the machine learning model (e.g., the pre-trained AI) is determined by aggregating the influence of the content items created by XYZ on the pre-trained AI during the training phase. For example, a content creator that contributes a relatively large number of content items and/or content items that vary in style may have more influence on the generative AI than another content creator that contributes a relatively small number of content items and/or whose content items have a very similar style. The online phase occurs after the training phase. In the online phase, the generative AI is online and ready to receive input and generate output (derivative content). The online phase may also be referred to as the generative phase or the inference phase. Both the offline phase and the online phases may be used by the model-based attribution.

The systems and techniques described herein create a model-based attribution vector that identify the attribution for one or more content creators ("creators"). As used herein, the term 'model-based' refers to determining the influence of content items (created by the creators) on the AI when the AI is being trained and when the AI is used to generate output. For example, assume a training set includes 600 content items from creator A, 300 content items from creator B, and 100 content items from creator C. During training, assume each content item is determined to have the same amount of influence on the AI. In this first example, content generated by the trained AI may result in an attribution vector (60, 30, 10) indicating that there is 60% attribution for creator A, 30% attribution for creator B, and 10% attribution for creator C. Of course, in some cases, each content item may not have the same amount of influence on the AI. As a second example, assume the content items of creator B have twice the influence on the trained AI as the content items of creator A, making the overall influence of creator B the same as the influence of creator A. In this second example, the attribution vector may be (45, 45, 10) indicating that there is 45% attribution for creator A, 45% attribution for creator B, and 10% attribution for creator C. The attribution vector specifies the percentage of influence that each content item, content creator, pool (an organized collection of data), category, or any combination thereof have in the creation (e.g., training) of the trained AI.

Model-based attribution may be used to determine several types of attribution (provenance): (1) top-N attribution where the influence (attribution) of the strongest N contributors (creators) on the AI is determined (note that N=1 may be used to determine the influence of a single creator), (2) adjusted attribution where the influence of adjusting the training set (e.g., training data) on the AI is determined, or (3) complete attribution where the influence of each content item used to train the AI is determined.

The systems and technique use a pre-trained (e.g., using public domain data sets) machine learning model (MLM, also referred to herein as a model or an AI), MLMbase, and creators Ci (e.g., i>0), where C1 is a first creator, C2 is a second creator, and so on. For each creator Ci, create a trained MLMi (e.g., trained AI) that is trained using content created by creator Ci. The systems and techniques determine the contribution of creator Ci to the base machine learning model (e.g., AI) by comparing MLMbase with MLMi. The systems and techniques may determine a relative contribution of each content item created by creator Ci (that was used to train the AI) and then aggregate the contributions to determine the contribution of creator Ci. For example, if the creator Ci has created content items 1 to k (k>0) then, during training, the systems and techniques may track, store, and aggregating the influence of each content item 1 to k on gradients of MLMi (associated with creator Ci). The difference in parameters of MLMi and MLMbase may be used to determine an attribution of individual creators. Parameters refers to values of a neural network that are learned during training and may include weights and biases. For example, during training, changes to weights Wi (of the AI) caused by content items 1 to k may be multiplied by their respective activations Vi (i>0) to determine a relative contribution of the content items 1 to k. In this way, the systems and techniques may determine the attribution of an individual content creator. Of course, in some cases, one model may be trained for each creator while in other cases one model, MLMAll, may be trained for all creators. For example, MLMBase, MLMi, MLMAll (e.g., all creators), or any combination thereof may be used to determine model-based attribution.

Determining the difference between MLMi and MLMbase (or MLMAll and MLMbase) may be done in several different ways. For example, after generating a new content item with a text prompt p and the model MLMi (or MLMAll), determining the largest similarity, smallest distance d_i, or another measure of proximity (similarity) may be performed among all content items from the data set that were used to train MLMbase and the newly generated content item. The proximity (similarity or distance) measurement may be computed using embeddings of all content items that were considered, for example, by using transformer networks. Additionally, the same text prompt p may be fed into the model MLMbase to create a reference content item. The reference content item represents what would have happened to prompt p if there had been no fine tuning to obtain MLMi (or MLMAll). The systems and techniques may determine the smallest distance d_base between the reference content item and the data set used to train MLMbase. In this example, d_i represents a uniqueness of the output of MLMi while d_base represents a uniqueness of the output of MLMbase. The difference between d_base and d_i indicates how much more unique the model MLMi is compared to MLMbase (similarly, the difference between d_base and d_all indicates a uniqueness of the model MLMAll compared to MLMbase). In this way, another metric for model attribution may be used, e.g., a transformativeness factor (TF) of the model MLMbase. TF may be determined as the relative increase of the distance d_i (or d_all) compared to d_base and represents how much the fine-tuning contributed to creating MLMi (from MLMbase), resulting in the generation of a more unique content item for the prompt p. In addition, the systems and techniques may determine a range of TF values by using this technique for a range of different prompts p (e.g., using multiple different seeds). By averaging the resulting TF values, the systems and techniques may determine a robust assessment of how transformative the fine-tuning was for the model.

In addition to the relative transformativeness factor (TF), the systems and techniques may use the absolute uniqueness of a content item generated by the model MLMi (or MLMAll) using the prompt p. The absolute uniqueness may be determined by determining the smallest distance, largest similarity, or both among all content items from the data set that were used to train MLMbase. In some cases, the absolute uniqueness value and the relative transformativeness factor (TF) may be combined with the other model-based attribution techniques described herein. After the training phase is completed, for a particular prompt p, the comparison between (i) the activations Vi from the model MLMi (or MLMAll) and (ii) the activations Vbase from the model MLMbase may be used to measure model attribution. When a new output (e.g., image) is generated, each weight may be activated differently. The activated output of a weight is referred to as the activation of the weight. The contribution that each content item has on each weight during the training phase may be multiplied with the activation of each respective weight during inference. By averaging the resulting multiplied values for each content item, the attribution of each content item on the resulting output (e.g., generated image) may be determined. In some cases, attribution data and metadata associated with the generated output may be stored within the generated output as an invisible watermark, on a blockchain (e.g., as described in U.S. Provisional Application 63/422,885), or both.

As a first example, a method includes training, by one or more processors, an artificial intelligence to create a trained artificial intelligence to generate a particular type of derivative content. The training includes selecting a content creator from multiple content creators to create a selected content creator, selecting a plurality of content items associated with the content creator to create selected content items, training the artificial intelligence using the selected content items, determining a creator influence of the selected content creator on the trained artificial intelligence based on an aggregate influence of the selected content items on the artificial intelligence during the training, and including the creator influence in a static attribution vector. The training may include determining a content item influence of individual content items of the plurality of content items on a plurality of training techniques used to train the artificial intelligence comprises determining a difference between: a first set of parameters associated with the artificial intelligence, and a second set of parameters associated with the trained artificial intelligence, where the second set of parameters comprises a plurality of weights, a plurality of biases, or any combination thereof. The training may include aggregating the content item influence of individual content items of the plurality of content items on the plurality of training techniques used to train the artificial intelligence and determining the creator influence based on the aggregating. The training may include determining a content item influence of individual content items of the plurality of content items associated with the content creator using a converging function. After determining that the training of the artificial intelligence has been completed, the method includes determining, by the one or more processors, that the trained artificial intelligence has received an input. The method includes generating, by the artificial intelligence, an output based on the input. While generating the output, the method may include determining a plurality of activations of different weights in the trained artificial intelligence, aggregating, for individual content creators of the multiple content creators, the plurality of activations of different weights in the trained artificial intelligence, and determining a dynamic attribution vector based at least in part on the aggregating. The method includes creating, by the one or more processors, an attribution determination based at least in part on the static attribution vector. In some cases, the method may include creating the attribution determination based at least in part on: the static attribution vector, the dynamic attribution vector, or any combination thereof. The method includes initiating, by the one or more processors, providing compensation to one or more of the multiple content creators based at least in part on the attribution determination. The method may include determining the content item influence of individual content items of the plurality of content items on the plurality of training techniques used to train the artificial intelligence. The output may include a digital image, a digital media item that includes text, a digital audio item, a digital video item, or any combination thereof.

As a second example, a server includes one or more processors, and a non-transitory memory device to store instructions executable by the one or more processors to perform various operations. The operations include training an artificial intelligence to create a trained artificial intelligence to generate a particular type of derivative content. The training includes: selecting a content creator from multiple content creators to create a selected content creator, selecting a plurality of content items associated with the content creator to create selected content items, training the artificial intelligence using the selected content items, determining a creator influence of the selected content creator on the trained artificial intelligence based on an aggregate influence of the selected content items on the artificial intelligence during the training, and including the creator influence in a static attribution vector. Determining a content item influence of individual content items of the plurality of content items on a plurality of training techniques used to train the artificial intelligence may include determining a difference between: a first set of parameters associated with the artificial intelligence, and a second set of parameters associated with the trained artificial intelligence. For example, the second set of parameters may include a plurality of weights, a plurality of biases, or any combination thereof. The training may include aggregating the content item influence of individual content items of the plurality of content items on the plurality of training techniques used to train the artificial intelligence. The training may include determining the creator influence based on the aggregating. The training may include determining a content item influence of individual content items of the plurality of content items associated with the content creator using a converging function. For example, the converging function may include: batch gradient descent, stochastic gradient descent, or any combination thereof. After determining that the training of the artificial intelligence has been completed, the operations include determining that the trained artificial intelligence has received an input. The operations include generating, by the artificial intelligence, an output based on the input. The operations include creating an attribution determination based at least in part on the static attribution vector. The operations include initiating providing compensation to one or more of the multiple content creators based at least in part on the attribution determination. While generating the output, the operations may include determining a plurality of activations of different weights in the trained artificial intelligence, aggregating, for individual content creators of the multiple content creators, the plurality of activations of different weights in the trained artificial intelligence, and determining a dynamic attribution vector based at least in part on the aggregating. The operations may include creating the attribution determination based at least in part on: the static attribution vector, the dynamic attribution vector, or any combination thereof. The trained artificial intelligence may include: a latent diffusion model, a generative adversarial network, a generative pre-trained transformer, a variational autoencoder, a multimodal model, or any combination thereof.

As a third example, a non-transitory computer-readable memory device is used to store instructions executable by one or more processors to perform various operations. The operations include training an artificial intelligence to create a trained artificial intelligence to generate a particular type of derivative content. For example, the trained artificial intelligence comprises: a latent diffusion model, a generative adversarial network, a generative pre-trained transformer, a variational autoencoder, a multimodal model, or any combination thereof. The training includes: selecting a content creator from multiple content creators to create a selected content creator, selecting a plurality of content items associated with the content creator to create selected content items, training the artificial intelligence using the selected content items, determining a creator influence of the selected content creator on the trained artificial intelligence based on an aggregate influence of the selected content items on the artificial intelligence during the training, and including the creator influence in a static attribution vector. Determining a content item influence of individual content items of the plurality of content items on a plurality of training techniques used to train the artificial intelligence may include determining a difference between: a first set of parameters associated with the artificial intelligence, and a second set of parameters associated with the trained artificial intelligence, wherein the second set of parameters comprises a plurality of weights, a plurality of biases, or any combination thereof, aggregating the content item influence of individual content items of the plurality of content items on the plurality of training techniques used to train the artificial intelligence, and determining the creator influence based on the aggregating. The training may include determining a difference between a first set of parameters of the artificial intelligence and a second set of parameters of the trained artificial intelligence. The training may include determining the creator influence of the selected content creator on the trained artificial intelligence based on the difference between the first set of parameters of the artificial intelligence and the second set of parameters of the trained artificial intelligence. After determining that the training of the artificial intelligence has been completed, the operations include determining that the trained artificial intelligence has received an input. The operations include generating, by the artificial intelligence, an output based on the input. The operations include creating an attribution determination based at least in part on the static attribution vector. The operations include initiating providing compensation to one or more of the multiple content creators based at least in part on the attribution determination. The operations may include: determining a plurality of activations of different weights in the trained artificial intelligence, aggregating, for individual content creators of the multiple content creators, the plurality of activations of different weights in the trained artificial intelligence, and determining a dynamic attribution vector based at least in part on the aggregating. The operations may include creating the attribution determination based at least in part on: the static attribution vector, the dynamic attribution vector, or any combination thereof.

As a fourth example, a server includes one or more processors and a non-transitory memory device to store instructions executable by the one or more processors to perform various operations. The operations include determining that a training of an artificial intelligence has been completed, thereby creating a trained artificial intelligence. The operations include determining an attribution vector created during the training of the artificial intelligence. The operations include determining that the trained artificial intelligence has received an input. The operations include generating, by the trained artificial intelligence, an output based on the input. The operations include determining an attribution determination for individual content creators of multiple content creators based on the attribution vector and based on identifying one or more of the creators that contributed at least a threshold amount during the training. A particular creator having a contribution less than the threshold amount does not receive a creator attribution. The operations include initiating providing compensation to one or more of the multiple content creators based at least in part on the attribution determination. Training the artificial intelligence to create the trained artificial intelligence includes: selecting a content creator from multiple content creators to create a selected content creator, selecting a plurality of content items associated with the selected content creator to create selected content items, training the artificial intelligence using the selected content items, determining a measure of a proximity between: (i) the artificial intelligence trained using the selected content items and (ii) the artificial intelligence prior to initiating the training, determining a creator influence of the content creator on the trained artificial intelligence based at least in part on the measure of the proximity, and including the creator influence in an attribution vector. The operations may include determining a transformativeness factor of the trained artificial intelligence relative to the artificial intelligence based at least in part on the measure of the proximity and determining the attribution vector based at least in part on the transformativeness factor. The training may also include: determining a content item influence of individual content items of the plurality of content items associated with the content creator using a converging function comprising either a batch gradient descent function or a stochastic gradient descent function. Generating the output may include: determining a plurality of activations of different weights in the trained artificial intelligence, aggregating, for individual content creators of the multiple content creators, the plurality of activations of different weights in the trained artificial intelligence, and determining the attribution vector based at least in part on the aggregating. The operations may include storing the attribution vector in a blockchain. The training may include: determining a contribution of individual content items of the selected content items associated with the selected content creator on gradients of the artificial intelligence during the training, aggregating contributions of the selected content items, and determining a contribution of the selected content creator based at least in part on the aggregating. The training may include: determining a change caused by individual content items of the selected content items associated with the selected content creator to weights of the artificial intelligence during the training, determining a number of activations caused by individual content items of the selected content items, and determining a contribution of the selected content creator based at least in part on multiplying the change to the weights by the number of activations.

As a fifth example, a method includes: determining, by one or more processors, that a training of an artificial intelligence has been completed, thereby creating a trained artificial intelligence. The method includes determining, by the one or more processors, an attribution vector created during the training of the artificial intelligence. The method includes determining, by the one or more processors, that the trained artificial intelligence has received an input. The method includes generating, by the trained artificial intelligence, an output based on the input. The method includes determining, by the one or more processors, an attribution determination for individual content creators of multiple content creators based on the attribution vector and based on determining one or more of the multiple content creators that contributed at least a threshold amount during the training. For example, a particular creator having a contribution less than the threshold amount does not receive a creator attribution. The method includes initiating, by the one or more processors, providing compensation to one or more of the multiple content creators based at least in part on the attribution determination. Training the artificial intelligence to create the trained artificial intelligence includes: (1) selecting a content creator from multiple content creators to create a selected content creator, (2) selecting a plurality of content items associated with the selected content creator to create selected content items, (3) training the artificial intelligence using the selected content items, (4) determining a measure of a proximity between: (i) the artificial intelligence trained using the selected content items, and (ii) the artificial intelligence prior to initiating the training, (5) determining a creator influence of the content creator on the trained artificial intelligence based at least in part on the measure of the proximity, and (6) including the creator influence in an attribution vector. The method may include: determining a transformativeness factor of the trained artificial intelligence relative to the artificial intelligence based at least in part on the measure of the proximity and determining the attribution vector based at least in part on the transformativeness factor. The method may include: while generating the output, determining: activations of neural pathways in the trained artificial intelligence and an amount of individual activations. After determining that the trained artificial intelligence has completed generating the output, the method may include creating a dynamic attribution vector based on the activations of the neural pathways and the amount of the individual activations. The dynamic attribution vector indicates an influence of the individual content creators on the output. The method may include creating the attribution vector based at least in part on the dynamic attribution vector. The training may include determining a content item influence of individual content items of the plurality of content items associated with the content creator using a converging function comprising a loss minimization algorithm that uses a direction and a learning rate to reduce a cost function close to zero. The training may include: (1) determining a number of activations caused to individual parameters of the artificial intelligence, (2) determining a relative contribution of the selected content items of individual content creators based at least in part on a change in parameters of the trained artificial intelligence caused by the multiple content items with their respective activations, (3) after completing the training to create the trained artificial intelligence, generating a static attribution vector based on the relative contribution of the selected content items of individual content creators, and (4) creating the attribution vector based at least in part on the static attribution vector. The method may include storing the attribution vector in a blockchain.

As a sixth example, a server may include one or more processors and a non-transitory memory device to store instructions executable by the one or more processors to perform various operations. The operations include determining that a training of an artificial intelligence has been completed thereby creating a trained artificial intelligence. The operations include determining an attribution vector created during the training of the artificial intelligence. The operations include determining that the trained artificial intelligence has received an input. The operations include generating, by the trained artificial intelligence, an output based on the input. The operations include determining an attribution determination for individual content creators of multiple content creators based on the attribution vector and based on identifying one or more of the multiple content creators that contributed at least a threshold amount during the training. For example, a particular creator having a contribution less than the threshold amount does not receive a creator attribution. The operations include initiating providing compensation to one or more of the multiple content creators based at least in part on the attribution determination. Training the artificial intelligence to create the trained artificial intelligence includes: selecting a content creator from multiple content creators to create a selected content creator, selecting a plurality of content items associated with the selected content creator to create selected content items, training the artificial intelligence using the selected content items, determining a measure of a proximity between the artificial intelligence trained using the selected content items and the artificial intelligence prior to initiating the training, determining a creator influence of the content creator on the trained artificial intelligence based at least in part on the measure of the proximity, and including the creator influence in an attribution vector. The operations may include determining a transformativeness factor of the trained artificial intelligence relative to the artificial intelligence based at least in part on the measure of the proximity; and determining the attribution vector based at least in part on the transformativeness factor. The operations may include while generating the output, determining activations of neural pathways in the trained artificial intelligence; and an amount of individual activations. The operations may include, after determining that the trained artificial intelligence has completed generating the output, creating a dynamic attribution vector based on the activations of the neural pathways and the amount of the individual activations. The dynamic attribution vector indicates an influence of the individual content creators on the output. The operations may include creating the attribution vector based at least in part on the dynamic attribution vector. The operations may include storing the attribution vector in a blockchain. The training may include determining a contribution of individual content items of the selected content items associated with the selected content creator on gradients of the artificial intelligence during the training, aggregating contributions of the selected content items, and determining a contribution of the selected content creator based at least in part on the aggregating. The training may include determining a change caused by individual content items of the selected content items associated with the selected content creator to weights of the artificial intelligence during the training, determining a number of activations caused by individual content items of the selected content items, and determining a contribution of the selected content creator based at least in part on multiplying the change to the weights by the number of activations.

As a seventh example, a non-transitory computer-readable memory device is used to store instructions executable by one or more processors to perform various operations comprising. The operations include determining that a training of an artificial intelligence has been completed. The operations include creating a trained artificial intelligence. The operations include determining an attribution vector created during the training of the artificial intelligence. The operations include determining that the trained artificial intelligence has received an input. The operations include generating, by the trained artificial intelligence, an output based on the input. The operations include determining an attribution determination for individual content creators of multiple content creators based on the attribution vector and based on identifying one or more of the multiple content creators that contributed at least a threshold amount during the training. For example, a particular creator having a contribution less than the threshold amount does not receive a creator attribution. The operations include initiating providing compensation to one or more of the multiple content creators based at least in part on the attribution determination. Training the artificial intelligence to create the trained artificial intelligence includes: selecting a content creator from multiple content creators to create a selected content creator, selecting a plurality of content items associated with the selected content creator to create selected content items, training the artificial intelligence using the selected content items, determining a measure of a proximity between: (i) the artificial intelligence trained using the selected content items and (ii) the artificial intelligence prior to initiating the training, determining a creator influence of the content creator on the trained artificial intelligence based at least in part on the measure of the proximity, and including the creator influence in an attribution vector. The operations may include, while generating the output, determining activations of neural pathways in the trained artificial intelligence and an amount of individual activations. The operations may include, after determining that the trained artificial intelligence has completed generating the output, creating a dynamic attribution vector based on the activations of the neural pathways and the amount of the individual activations. The dynamic attribution vector indicates an influence of the individual content creators on the output. The operations may include creating the attribution vector based at least in part on the dynamic attribution vector. The training may include: determining a content item influence of individual content items of the plurality of content items associated with the content creator using a converging function comprising a loss minimization algorithm that uses a direction and a learning rate to reduce a cost function close to zero. The operations may include: determining a contribution of individual content items of the selected content items associated with the selected content creator on gradients of the artificial intelligence during the training, aggregating contributions of the selected content items, and determining a contribution of the selected content creator based at least in part on the aggregating. The training may include: determining a change caused by individual content items of the selected content items associated with the selected content creator to weights of the artificial intelligence during the training, determining a number of activations caused by individual content items of the selected content items, and determining a contribution of the selected content creator based at least in part on the change to the weights and the number of activations.

FIG. 1 is a block diagram of a system 100 illustrating different ways to determine attribution of an output produced by a generative artificial intelligence (AI), according to some embodiments. Before a generative AI is deployed, the generative AI undergoes a training phase 101 in which the generative AI is trained to produce a particular type of content. Typically, a generative AI comes pre-trained (e.g., using public data) and then undergoes further training with a particular type of content (e.g., digital image, music, text-based fiction book, or the like) to enable the generative AI to generate the particular type of content.

Multiple creators 102(1) to 102(N) (N>0) may create content items 104(1) to 104(P) (P>0). The content items 104 may include, for example, digital artwork (including original digital artwork and original artwork that has been digitized), digital images (e.g., photographs), digital music, digital text-based content (e.g., eBooks), digital video, another type of digital content, or any combination thereof. In some cases, at least a portion of the content items 104 may be accessible via one or more sites 106(1) to 106(M) (M>0).

For example, the creators 102 may upload one or more of the content items 104 to one or more of the sites 106 to make the content items 104 available for acquisition (e.g., purchase, lease, or the like). The content items 104 may be copied (e.g., via a web crawler or the like) from the sites 106 or links obtained and used as training data 108 to perform training 110 of a generative artificial intelligence 112 to create a generative AI 114 (e.g., trained). The generative AI 114 may be a latent diffusion model or another type of generative AI. A generative AI, such as the AI 112, typically comes pre-trained (e.g., using open-source data), after which further training (the training 110) is performed to create the generative AI 114. For example, when the training 110 uses data 108 that includes images of paintings, then the pre-trained AI 112 may be trained to generate images of paintings, when the training 110 uses rhythm and blues songs, then the pre-trained AI 112 may be trained to create the AI 114 that generates rhythm and blues songs, when the training 110 uses science fiction novels, then the pre-trained AI 112 may be trained to create the AI 114 that generates science fiction novels, and so on. To illustrate, the AI 112 may be a pre-trained model $SD_{BASE}$, such as LAION (Large-scale Artificial Intelligence Open Network) or another generative AI model that is trained using open-source datasets. Using the content items 104, the model $SD_{BASE}$ is tuned to create the generative AI 114, e.g., $SD_{TUNED}$. For example, the generative AI 114 may be tuned to generate a particular type of derivative content, such as, for example, digital images of artwork, digital images of photos, digital music in a particular style, or the like. During the training phase 101, categories 138 associated with the training data 108 (e.g., the content items 104) may be identified. For example, for artwork, the categories 138 may identify the main colors (e.g., red, blue, green, and the like) present in the training data 108, the high-level content (e.g., portrait, landscape, or the like) present in the training data 108, the content details (e.g., human, animal, furniture, jewelry, waterfall, river, ocean, mountain(s), or the like) present in the training data 108, the style (renaissance, modern, romanticism, neo-classical, hyper-realism, pop art, or the like) in the training data 108, and so on.

After the generative AI 114 has been created via the training 110, a user, such as a representative user 132 (e.g., a secondary creator), may use the generative AI 114 to generate derivative content, such as output 118. For example, the representative user 132 may provide input 116, such as input, e.g., "create <content type> <content description> in the style of <creator identifier>". In this example, <content type> may include digital art, digital music, digital text, digital video, another type of content, or any combination thereof. The <content description> may include, for example, "a portrait of a woman with a pearl necklace", "a rhythm and blues song", "a science fiction novel", "an action movie", another type of content description, or any combination thereof. The <creator identifier> may include, for example, "Vermeer" (e.g., for digital art), "Aretha Franklin" (e.g., for digital music), "Isaac Asimov" (e.g., for science fiction novel), "James Cameron" (e.g., for action movie), or the like. The input 116 may be text-based input, one or more images (e.g., drawings, photos, or other types of images), or input provided using one or more user-selectable settings.

Based on the input 116, the generative AI 114 may produce the output 118. For example, the output 118 may include digital art that includes a portrait of a woman with a pearl necklace in the style of Vermeer, digital music that includes a rhythm and blues song in the style of Aretha Franklin, a digital book that includes a science fiction novel in the style of Isaac Asimov, a digital video that includes an action movie in the style of James Cameron, and so on. The input 116 may be converted into an embedding to enable the generative AI 114 to understand and process the input 116.

Attribution for the derivative content in the output 118 may be performed in one of several ways. Input-based attribution 120 involves analyzing the input 116 to determine the attribution of the output 118. Model-based attribution 122 may create a static attribution vector 136 that specifies a percentage of influence that each content item, content creator, and/or category had in the training of the generative AI 114 and when the generative AI 114 generates output. Each input text may trigger (e.g., activate) different pathways of the neural network of the AI 114 and at different intensities. For example:

$$\text{Static Vector 136} = \{SC1, SC2, \ldots SCn\}$$

where $SCi$ ($0 < i <= n$) is a distance (e.g., similarity) of the content created by Creator $102(i)$ to the output 118 determined based on an analysis of the input 116. A distance between two items, such as a generated item and a content item, is a measure of a difference between the two items. As distance decreases, similarity between two items increases and as distance increases, similarity between two items decreases. For example, if a distance d between two items I1 and I2 is less than or equal to a threshold T, then the items are considered similar and if d>T, then the items are considered dissimilar. Output-based attribution 124 involves analyzing the output 118 to determine the main X (X>0) influences that went into the output 118. Adjusted attribution 126 involves manual fine tuning of the generative process by specifying a desired degree of influence for each content item, artist, pool (an organized collection of data), category (e.g., the data 108) that the generative AI 114 was trained on. Adjusted attribution 126 enables the user 132 to adjust the output 118 by modifying an amount of influence provided by individual content item, creators, categories, and the like. For example, adjusted attribution 126 enables the user 132 to increase the influence of creator 102(N), which causes the generative AI 114 to generate the output 118 that includes content with a greater amount of content associated with creator 102(N).

One or more of: (i) the input-based attribution 120, (ii) the model-based attribution 122, (iii) the output-based attribution 124, (iv) the adjusted attribution 126, or (v) any combination thereof may be used by an attribution determination module 128 to determine an attribution for the content creators 102 that influenced the output 118. In some cases, the attribution determination 128 may use a threshold to determine how many of the creators 102 are to be attributed. For example, the attribution determination 128 may use the top X (X>0), such as the top five, top 8, top 10, or the like influences, to determine which of the creators 102 influenced the output 118 and are to be attributed. As another example, the attribution determination 128 may identify one or more of the creators 102 that contributed at least a threshold amount, e.g., Y %, such as 5%, 10%, or the like. In this way, if the influence of a particular creator 102 is relatively small (e.g., less than a threshold amount), then the particular creator 102 may not receive attribution, or may receive a small proportion of attribution. The attribution determination module 128 may determine attribution that is used to provide compensation 130 to one or more of the creators 102. For example, attribution determination module 128 may determine that a first creator 102 is to be attributed 40%, a second creator 102 is to be attributed 30%, a third creator 102 is to be attributed 20%, and a fourth creator is to be attributed 10%. The compensation 130 provided to one or more of the creators 102 may be based on the attribution determination. For example, the compensation 130 may include providing a statement accompanying the output 118 identifying the attribution ("this drawing is influenced Vermeer", "this song is influenced by Aretha", "this novel is influenced by Asimov", and so on), compensation (e.g., monetary or another type of compensation), or another method of compensating a portion of the creators 102 whose content items 104 were used to generate the output 118.

The generative AI 114 may be trained using images of a particular person (or a particular object) and used to create new images of that particular person (or particular object) in contexts different from the training images. The generative AI 114 may apply multiple characteristics (e.g., patterns, textures, composition, color-palette, and the like) of multiple style images to create the output 118. The generative AI 114 may apply a style that is comprehensive and includes, for example, categories (e.g., characteristics) such as patterns, textures, composition, color-palette, along with an artistic expression (e.g., of one or more of the creators 102) and intended message/mood (as specified in the input 116) of multiple style images (from the training data 108) onto a single content image (e.g., the output 118). Application of a style learned using private content (e.g., provided by the user 132) may be expressed in the output 118 based on the text included in the input 116. In some cases, the output 118 may include captions that are automatically generated by the generative AI 114 using a machine learning model, such as Contrastive Language-Image Pre-Training (CLIP), if human-written captions are unavailable. In some cases, the user 132 (e.g., secondary creator) may instruct the generative AI 114 to produce a 'background' of an image based on a comprehensive machine-learning-based understanding of the background of multiple training images to enable the background to be set to a transparent layer or to a user-selected color. The generative AI 114 may be periodically retrained to add new creators, to add new content items of creators previously used to train the generative AI 114, and so on.

The output 118 may include an embedding 134 (created using an encoder, such as a transformer). The embedding 134 may be a set of numbers, arranged in the form of a matrix (or a one-dimensional matrix, which is sometimes referred to as a vector). Each component of the vector (or matrix) may identify a particular category (e.g., characteristic) expressed in the input 116. To illustrate, a first component of the vector may specify a content type (e.g., digital image, digital music, digital book, or the like), a second component may specify a creator style (e.g., Picasso, Rembrandt, Vermeer, or the like), a third component may specify a painting style (e.g., impressionist, realist, or the like), a fourth component specify a component of the output (e.g., man, woman, type of animal, or the like), and so on. The output 118 may be relatively high resolution, such as, for example, 512 pixels (px), 768 px, 2048 px, 3072 px, or higher and may be non-square. For example, the user 132 may specify in the input 116 a ratio of the length to width of the output 118, such as 3:2, 4:3, 16:9, or the like, the resolution (e.g., in pixels) and other output-related specifications. In some cases, the output 118 may apply a style to videos with localized synthesis restrictions using a prior learned or explicitly supplied style.

During the training phase 101, the model-based attribution 122 may create the static attribution vector 136 for the generative AI 114. The AI 114 may be an "off the shelf" LDM or may be an LDM that has been fine-tuned specifically for a particular customer. The static attribution vector 136 specifies the percentage of influence that each content item, creator, pool (an organized collection of data), category had in the creation of the generative AI 114 (e.g., LDM). Thus, the static attribution vector 136 reflects the influence the content items 104 (and therefore the creators 102) had in the creation of the generative AI 114, e.g., the difference between the AI 112 and the AI 114.

The input-based attribution 120 may create an input-based dynamic attribution vector 137 for a specific output 118, e.g., generated content, that was generated by providing text t as input 116. The attribution vector 137 specifies the percentage of relevance each content item, creator, pool (an organized collection of data), category has based on the input 116. The input 116 may reveal influences, regardless of the type of generative model used to generate the output 118. The input-based attribution 120 may analyze the input 116 to identify various components that the generative AI 114 uses to create the output 118. First, the input-based attribution 120 may analyze the input 116 to determine creator identifiers (e.g., creator names) that identify one or more of the creators 102. For example, if a particular creator of the creators 102 (e.g., Picasso, Rembrandt, Vermeer, or the like for art) is explicitly specified in the input 116, then the bias of the particular creator is identified by adding the particular creator to the dynamic attribution vector 137. Second, the input-based attribution 120 may analyze the input 116 to determine one or more categories, such as specific styles, objects, or concepts, in the input 116. The input-based attribution 120 may determine a particular category in the input 116 and compare the particular category with categories included in descriptions of individual creators 102. To illustrate, if the input 116 has the word "dog" (a type of category), then "dog" (or a broader category, such as "animal") may be used to identify creators 102 (e.g., Albrecht Durer, Tobias Stranover, Carel Fabritius, or the like) who are described as having created content items 104 that include that type of category (e.g., "dog" or "animal"). To enable such a comparison, a description Dj is created and maintained for each creator Cj, where each description contains up to k (k>0) categories. The description may be supplied by the creator or generated automatically using a machine learning model, such as CLIP, to identify which categories are found in the content items 104 created by the creators 102. The descriptions of creators 102 may be verified (e.g., using a machine learning model) to ensure that the creators 102 do not add categories to their descriptions that do not match their content items 104. Third, the input-based attribution 120 may determine the embedding 134. To generate the output 118 from the input 116, the input 116 (e.g., text t) may be embedded into a shared language-image space using a transformer to create the embedding 134 (Et). The embedding 134 (Et) may be compared to creator-based embeddings ECi to determine the distance (e.g., similarity) of the input 116 to individual creators 102. A distance measurement (e.g., expressing a similarity) may be determined using a distance measure Di, such as cosine similarity, contrastive learning (e.g., self-supervised learning), Orchini similarity, Tucker coefficient of congruence, Jaccard index, Sorensen similarity index, or another type of distance or similarity measure. In some cases, the resulting input-based attribution 120 may be combined with the attribution of the output 118 Ot which is generated from the embedding 134 (Et) using the input text t using a transformer T. At an output-level, the embeddings ECi may be compared to the training data 108.

The adjusted attribution 126 enables the user 132 (e.g., secondary creator) to re-adjust the generative process by specifying a desired degree of influence for each content item, creator, pool (an organized collection of data), category in the training data 108 that was used to train the generative AI 114 when creating the output 118. This enables the user 132 to "edit" the output 118 by repeatedly adjusting the content used to create the output 118. For example, the user 132 may adjust the attribution by increasing the influence of creator 102(N) and decreasing the influence of creator 102(1) in the output 118. Increasing creator 102(N) results in instructing the generative AI 114 to increase an embedding of creator 102(N) in the output 118, resulting in the output 118 having a greater attribution to creator 102(N).

The output-based attribution 124 creates the dynamic attribution vector 137, e.g., for style transfer synthesis and for using the content and style images to adjust the attribution vector, e.g., by increasing the element in the attribution vector corresponding to the creator 102 who created the style images. The degree of influence for the generative AI 114 may also be manually adjusted, as described herein, using the adjusted attribution 126. The embedding 134 may include information identifying (1) one of more of the content creators 102 whose content items 104 are included in the output 118, (2) one or more of the content items 104 included in the output 118, (3) one or more of the categories 138 included in the output 118, or (4) any combination thereof. The output-based attribution 124 may use the embedding 134 to create the attribution vector 137.

Output-based attribution 124 may be performed (i) by comparing creator embeddings of individual creators 102 to the embedding 134 (e.g., where the embedding 134 identifies individual creators 102 used to create the output 118) to determine the dynamic attribution vector 137, (ii) by comparing embeddings of the content items 104 with the embedding 134 (e.g., where the embedding 134 identifies individual content items 104 used to create the output 118) to determine the dynamic attribution vector 137, (iii) by comparing content embeddings of characteristics of the content items 104 with the embedding 134 (e.g., where the embedding 134 identifies characteristics of individual creators 102 used to create the output 118) to determine the dynamic attribution vector 137, or (iv) any combination thereof. For example, the embedding 134 may identify: (i) the individual creators 102 whose content items were used to create the output 118, (ii) the content items 104 used to create the output 118, (iii) categories (e.g., characteristics), or (iv) any combination thereof.

The model-based attribution 122 may create the static attribution vector 136 during the training phase 101. The static attribution vector 136 identifies the influence of the content items 104 (and therefore the creators 102) when training the generative AI 114, e.g., the difference between the AI 112 and the AI 114. After the training (offline) phase 101 has been completed, the generative AI 114 is placed online. In the online phase, in response to receiving the input 116 (from the user 132), the generative AI 114 produces the output 118. During the generation of the output 118, the generative AI 114 may keep track of which particular neural pathways (corresponding to the creators 102) are activated and to what extent (e.g., weight or amount) the pathways are activated and create the dynamic attribution vector 137. The attribution determination 128 may use the static attribution vector 136, the dynamic attribution vector 137, or both to determine attribution prior to initiating providing the compensation 130 to the creators 102.

Thus, an AI may be trained using content to create a generative AI capable of generating derivative content based on the training content. The user (e.g., derivative content creator) may provide input, in the form of a description describing the desired output, to the generative AI. The generative AI may use the input to generate an output that includes derivative content derived from the training content. For model-based attribution, the changes caused by the training material (content items) to the AI during the training phase are used to determine a static attribution vector. When the trained AI is online and produces an output in response to receiving an input, the trained AI gathers information regarding (1) which creators are influencing the output and (2) to what extent (amount) each creator is influencing the output. The gathered information may be used to create a dynamic attribution vector. The static attribution vector, the dynamic attribution vector, or both may be used to determine attribution and to provide compensation to the creators.

Figure 2:
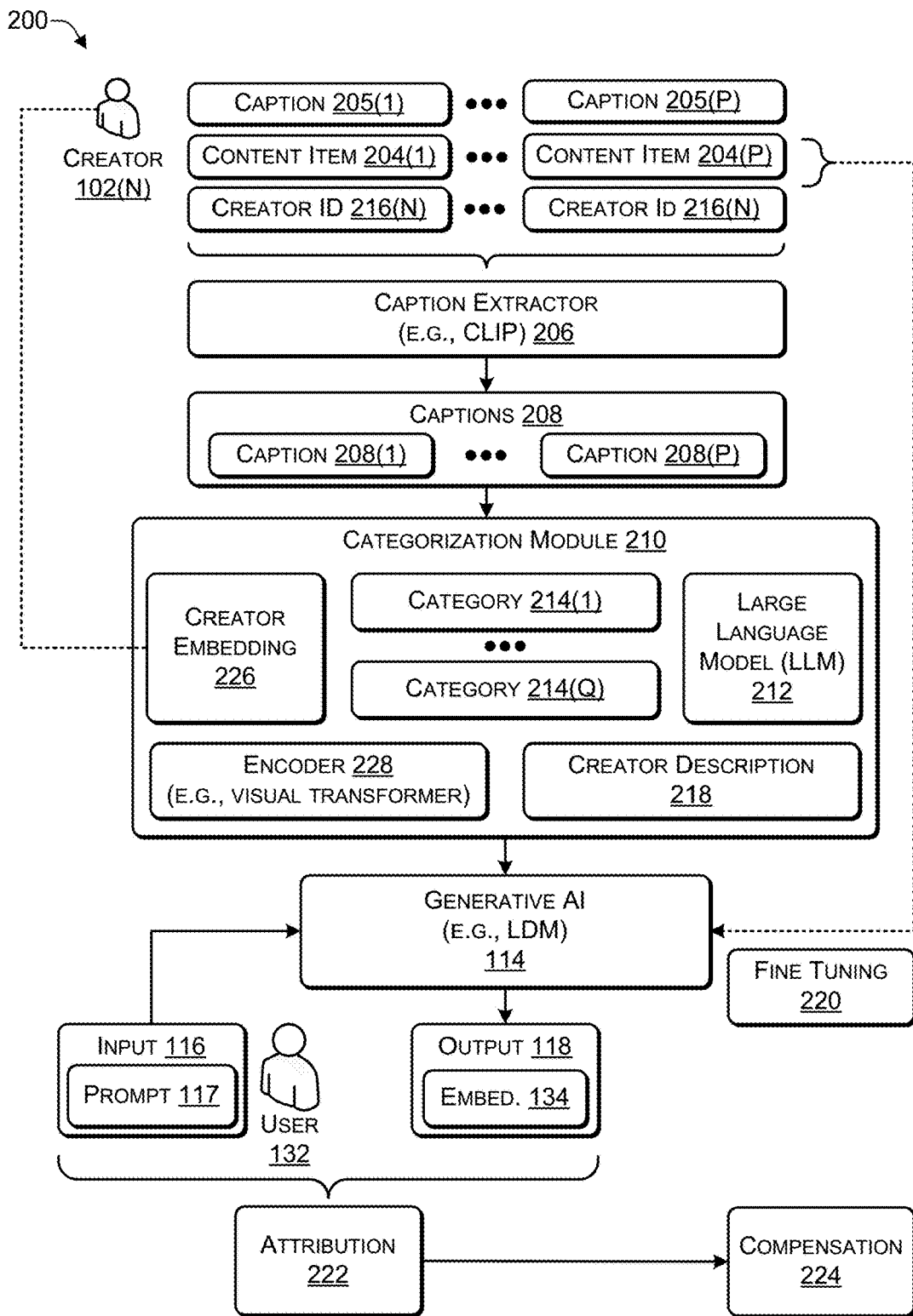
FIG. 2 is a block diagram of a system to train an artificial intelligence (AI) on a particular content creator, according to some embodiments.

FIG. 2 is a block diagram of a system 200 to train an artificial intelligence (AI) on a particular content creator, according to some embodiments. A creator 102(N) (N>0) may create one or more content items 204(1) to 204(P) (P>0) (e.g., a portion of the content items 104 of FIG. 1). The system 200 may be used to train the generative AI 114 to add (e.g., learn) the content items 204 associated with the creator 102(N). The system 200 may be used to train the generative AI 114 to add (learn) a new creator (e.g., content items 204 of the creator 102(N) were not previously used to train the generative AI 114) or add additional content items created by a creator. For example, assume the creator 102(N) creates a first set of content items during a first time period (e.g., Y years, Y>0). The generative AI 114 is trained using the first set of content items to add the creator 102(N). Subsequently, the creator 102(N) creates a second set of content items. The generative AI 114 may be trained using the second set of content items to update the knowledge associated with the creator 102(N).

In some cases, the content items 204 may have associated captions 205 that describe individual content items. For example, caption 205(1) may be a caption that describes the content item 204(1) and caption 205(P) may be a caption that describes the content item 204(P). If one or more of the content items 204 do not have an associated caption 205 or to supplement the caption 205, a caption extractor 206 may be used to create captions 208, where caption 208(1) describes content item 204(1) and caption 208(P) describes content item 204(P). The caption extractor 206 may be implemented using, for example, a neural network such as Contrastive Language Image Pre-training (CLIP), which efficiently learns visual concepts from natural language supervision. CLIP may be applied to visual classification, such as art, images (e.g., photos), video, or the like. The captions 208 produced by the caption extractor 206 may be text-based.

A unique identifier (id) 216 may be assigned to each content item 204 associated with individual creators. A unique id 216(N) may be associated with each of the content items 204 associated with the creator 102(N). For example, the unique id 216(N) may be associated with each of the content items 204 using a deep learning generative model (e.g., Dreambooth or similar) used to fine-tune text-to-image models. The caption extractor 206 may be used to create a caption 208 for each content item 204 if one or more if the content items 204 do not have an associated caption 205 or to supplement the caption 205.

The categorization module 210 is used to identify categories 214(1) to 214(Q) based on the captions 205, 208 associated with each content item. For example, a visual image of a dog and a cat on a sofa may result in the captions "dog", "cat", "sofa". The categorization module 210 may use a large language model 212 to categorize the captions 208. For example, dog and cat may be placed in an animal category 214 and sofa may be placed in a furniture category 214. In this way, the categorization module 210 may create a creator description 218 associated with the unique identifier 216. The creator description 218 may describe the type of content items 204 produced by the creator 202. For example, the categorization module 210 may determine that the creator 202 creates images (e.g., photos or artwork) that include animals and furniture and indicate this information in the creator description 218.

For example, the creator embedding 226 may be viewed as an embedding point $E_{Ai}$ that represents the content items 204 created by artist $A_i$ (e.g., creator 102(N)) and what the generative AP 114 learns from the captions 208. The creator embedding 226 is created using an encoder 228 using an encoding technique, such as a visual transformers, denoted ViT. The generative AI 114 (e.g., $SD_{TUNED}$) may generate output 118 (e.g., an image $I_p$) based on prompt 117 (e.g., prompt p) provided by the user 132. To determine the attribution 222, the distance (e.g., distance $d_1$) of the embedding 134 (e.g., embedding $E_{Ip}$ of the image $I_p$) to the creator embedding 226 (e.g., $E_{A1}$).

The generative AI 114 may use the prompt 117 to produce the output 118. The output 118 may be compared with the creator embedding 226, the categories 214 associated with the creator 102(N), the content items 204, or any combination thereof. In some cases, fine tuning 220 may be performed to further improve the output of the generated AI 114 to enable the output 118 to closely resemble one or more of the content items 204. An attribution module 222, such as the input-based attribution 120, the model-based attribution 122, the output-based attribution 124, the adjusted attribution 126 or any combination thereof, may be used to determine the attribution and provide compensation 224 to the creator 202.

Thus, an AI may be trained on a particular creator by taking content items created by the particular creator, analyzing the content items to extract captions, and using a categorization module to categorize the captions into multiple categories, using a large language model. The particular creator may be assigned a unique creator identifier and the unique creator identifier may be associated with individual content items associated with the particular creator. The output of the generative AI may be fine-tuned to enable the generative AI to produce output that more closely resembles (e.g., has a greater proximity to) the content items produced by the particular creator.

Figure 3:
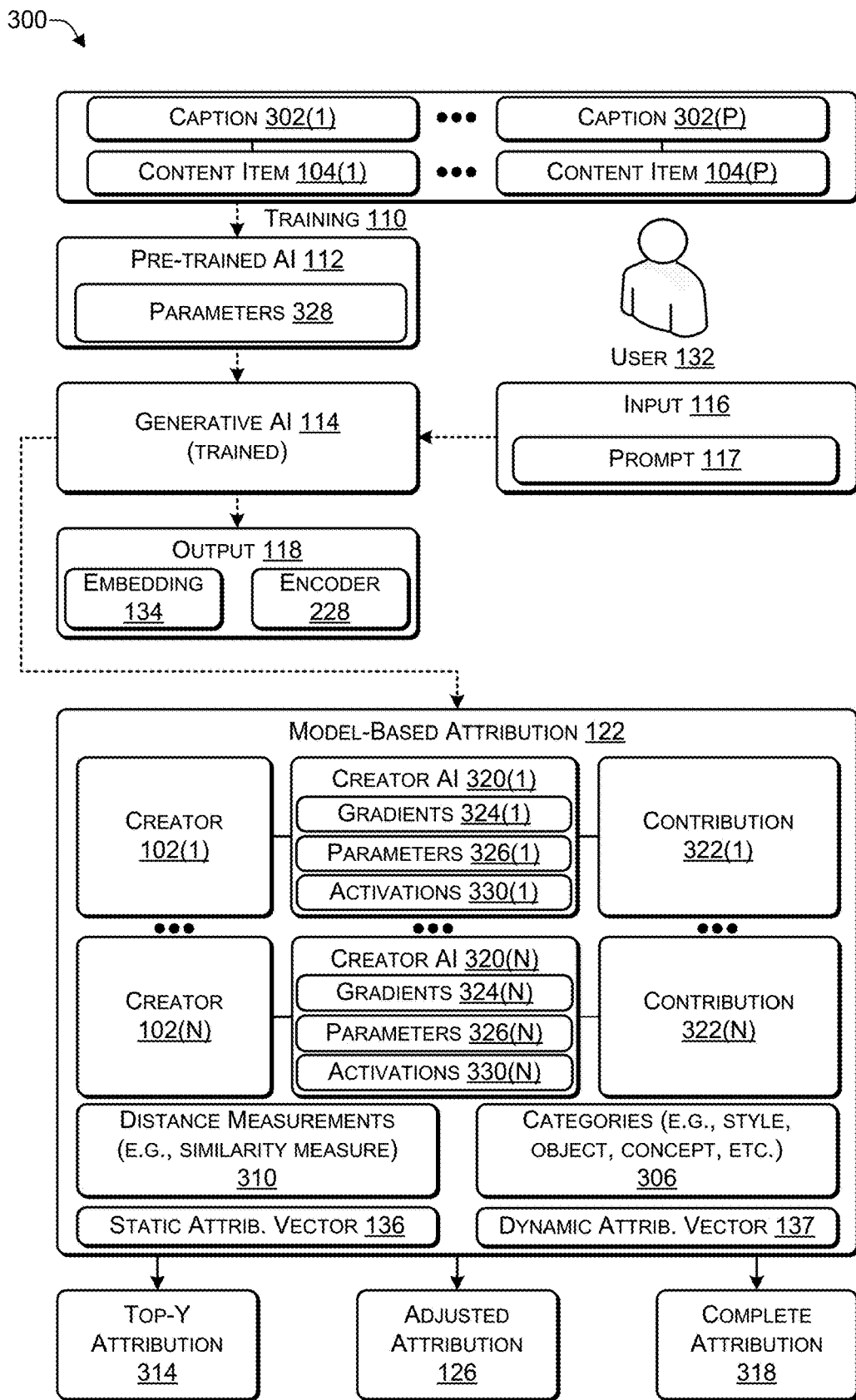
FIG. 3 is a block diagram of a system to create an attribution vector, according to some embodiments.

FIG. 3 is a block diagram of a system 300 to create an attribution vector, according to some embodiments. The model-based attribution 122 may create the attribution vector 136 based on monitoring the effect of content items 104 on the AI 112 during the training 110 to create the AI 114. When the AI 114 receives the input 116 and begins generating the output 118, the model-based attribution 122 may determine which neural pathways of the AI 114 are affected and measure an extent (e.g., weight) to which the individual neural pathways are affected and modify the attribution vector 136 to create the modified attribution vector 137. The attribution vector 136, 137 specifies an amount (e.g., a percentage or another type of measurement) of influence each content item, creator, pool (an organized collection of data), category, and the like has on the AI 114 when generating the output 118.

Each content item 104 may have an associated caption 302. For example, content item 104(1) may have an associated caption 302(1) and content item 104(P) may have an associated caption 302(P). Each caption 302 may include (i) the caption 205 (e.g., description) provided by the creator 102 that created the content item 104, (ii) the caption 208 created by the caption extractor 206 of FIG. 2, or both.

The model-based attribution 122 creates the model-based attribution vector 136 by determining the attribution for one or more content creators ("creators") 102 on the trained generative AI 114. For example, assume the training data 108 includes six hundred content items from creator A, three hundred content items from creator B, and one hundred content items from creator C. During training, assume each content item in the training data 108 is determined to have the same amount of influence. In this example, the output 118 generated by the trained AI 114 may result in the attribution vector 136 of (60, 30, 10), indicating that there is 60% attribution for creator A, 30% attribution for creator B, and 10% attribution for creator C. Of course, in some cases, each content item may have a different amount of influence on the trained AI 114. For example, assume the content items of creator B have twice the influence on the trained AI as the content items of creator A, making the overall influence of creator B the same as the influence of creator A. For example, the content items of creator B may have twice the influence because the content items have a large variation in style compared to the content items of creator A and therefore contribute twice as much to the training of the AI 114. In this example, the attribution vector may be (45, 45, 10) indicating that there is 45% attribution for creator A, 45% attribution for creator B, and 10% attribution for creator C. The attribution vector specifies the percentage of influence that each content item, content creator, pool (an organized collection of data), category, or any combination thereof have in the creation (e.g., training) of the trained AI 114.

The static attribution vector 136 may be determined during the training phase 101 (and each time the AI 114 is re-trained). The dynamic attribution vector 137 may be determined dynamically during runtime (e.g., after the training phase 101) based on determining and aggregating the activations of different weights in the generative AI 114 when the AI 114 is generating the output 118. For example, after receiving the input 116, the generative AI 114 may observe (i) which neural pathways are activated and (ii) to what extent the neural pathways are activated (e.g., weight) to produce the output 118 and use (i) and (ii) to dynamically determine the dynamic attribution vector 137. The model-based attribution 122 may use the static attribution vector 136, the dynamic attribution vector 137, or both.

Model-based attribution 122 may be used to determine several types of attribution (provenance): (1) top-Y attribution 314 where the influence (attribution) of the strongest Y creators 102 on the AI 114 is determined (note that Y=1 may be used to determine the influence of a single creator), (2) adjusted attribution 126 where the influence of adjusting the training set (e.g., training data) on the AI 114 is determined, or (3) complete attribution where the influence of each content item 104 used to train the AI 114 is determined.

The AI 112 is a pre-trained (e.g., using open-source data sets) machine learning model (MLM, also referred to as a model). The model-based attribution 122 may create a trained creator AI 320(N) that is trained using content created by creator 102(N), for each creator 102. The model-based attribution 122 may determine a contribution 322(N) of creator 102(N) to the base machine learning model (AI 112) by comparing individual creator AI 320(N) with AI 112, for each creator 102(1) to 102(N).

During the training phase 101, the model-based attribution 122 may determine a relative contribution of each content item 104 created by individual creators 102(M) (0<M<=N) and then aggregate the contributions to determine the contribution 322(N) of individual creators 102(N) to the AI 114. For example, if a creator 102(M) (1<M<=N) has created content items 104(1) to 104(P) then, during the training 110, the model-based attribution 122 may track, store, and aggregate the influence of each content item 104 on gradients 324 of creator AI 320 (associated with creator 102). The difference in parameters 326 of creator AI 320 and parameters 328 of the AI 112 may be used to determine an attribution of individual creators 102. The parameters 326, 328 may include values of a neural network that are learned during training 110, such as, for example, weights and biases. For example, during training, changes to weights (of the AI 112) caused by content items 104 may be multiplied by their respective activations 330 to determine a relative contribution of the content items 104. In this way, the model-based attribution 122 may determine the attribution of individual content creators 102 when training the AI 114 and use the determination to create the static attribution vector 136. The parameters 326, 328 refer to values of the neural network learned during the training 110 and may include weights and biases as used in traditional fully connected layers. In transformer architectures, there are other parameters as well, such as query, key, and value weights in the attention layers. Depending on the specific type of AI algorithm (machine learning model) being used, other parameters may also be present. The model-based attribution 122 uses the parameters associated with a particular AI algorithm used to implement the AI 114 to determine attribution.

For top-Y attribution 314, the model-based attribution 122 determines an influence of the top Y (Y>0) contributors (content creators 102) on the AI 114, during training 110, when generating the output 118, or both. In some cases, the top Y may be a predetermined number, such as top 5, top 10, or the like. In other cases, the top Y may be contributors (content creators) whose influence is greater than a threshold amount (e.g., 10%, 5%, or the like). Note that when Y=1, single-creator attribution is determined, e.g., the model-based attribution 122 determines the influence of a single content creator on the generative AI 114, e.g., the creator with the greatest influence on the generative AI 114 (e.g., during training 110, when generating the output 118, or both).

Adjusted attribution 126 determines the influence of a set of content creators, selected by the user 132, on the generative AI 114 when generating the output 118. For example, the user 132 may select a set of content creators (creators 102 of FIG. 1) and then "mix" (e.g., adjust) substantially in real-time, the influence of individual content creators in the set of content creators, and view the resulting output (substantially in real-time) until the output 118 satisfies the user 132. To illustrate, the user 132 may select a set of creators (e.g., artists Rembrandt, Degas, Dali, and Vermeer) and adjust, substantially in real-time, an amount of influence of each creator on the AI 114 until the user 132 is satisfied with the output 118. The adjusted attribution 126 may determine individual percentages of influence associated with each of the selected creators, with each percentage ranging from 0% to 100%. Adjusted attribution 126 affects the dynamic attribution vector 137 but not the static attribution vector 136.

For complete attribution 318, the model-based attribution 122 determines an influence of content items 104 used in the training data 108 (of FIG. 1) during training 110, when generating the output 118, or both. For example, the AI 112 may be pre-trained using open-source datasets and then fine-tuned using the content items 104 associated with the creators 102 to create the generative AI 114. The influence of the content items 104, and the associated creators 102, is determined during training 110, when generating the output 118, or both Thus, an off-the-shelf AI (e.g., trained using public data sets) may be trained using content items to create a generative AI capable of generating derivative content based on the training content. During training, the influence of the content items on the generative AI may be aggregated for each content creator to determine a static attribution vector that identifies how much each creator's content contributed to shaping the learning of the generative AI. After the training phase is complete, the generative AI is placed online (e.g., in service) and may receive input from a user (e.g., derivative content creator). The generative AI may use the input to generate an output that includes derivative content derived from the training content. For model-based attribution, the changes caused by the training material (content items) to the AI during the training phase are used to determine a static attribution vector. When the trained AI is online and produces an output in response to receiving an input, the trained AI gathers information regarding (1) which creators are influencing the output and (2) to what extent (amount) each creator is influencing the output. The gathered information may be used to create a dynamic attribution vector. The static attribution vector, the dynamic attribution vector, or both may be used to determine attribution and to provide compensation to the creators.

Figure 4:
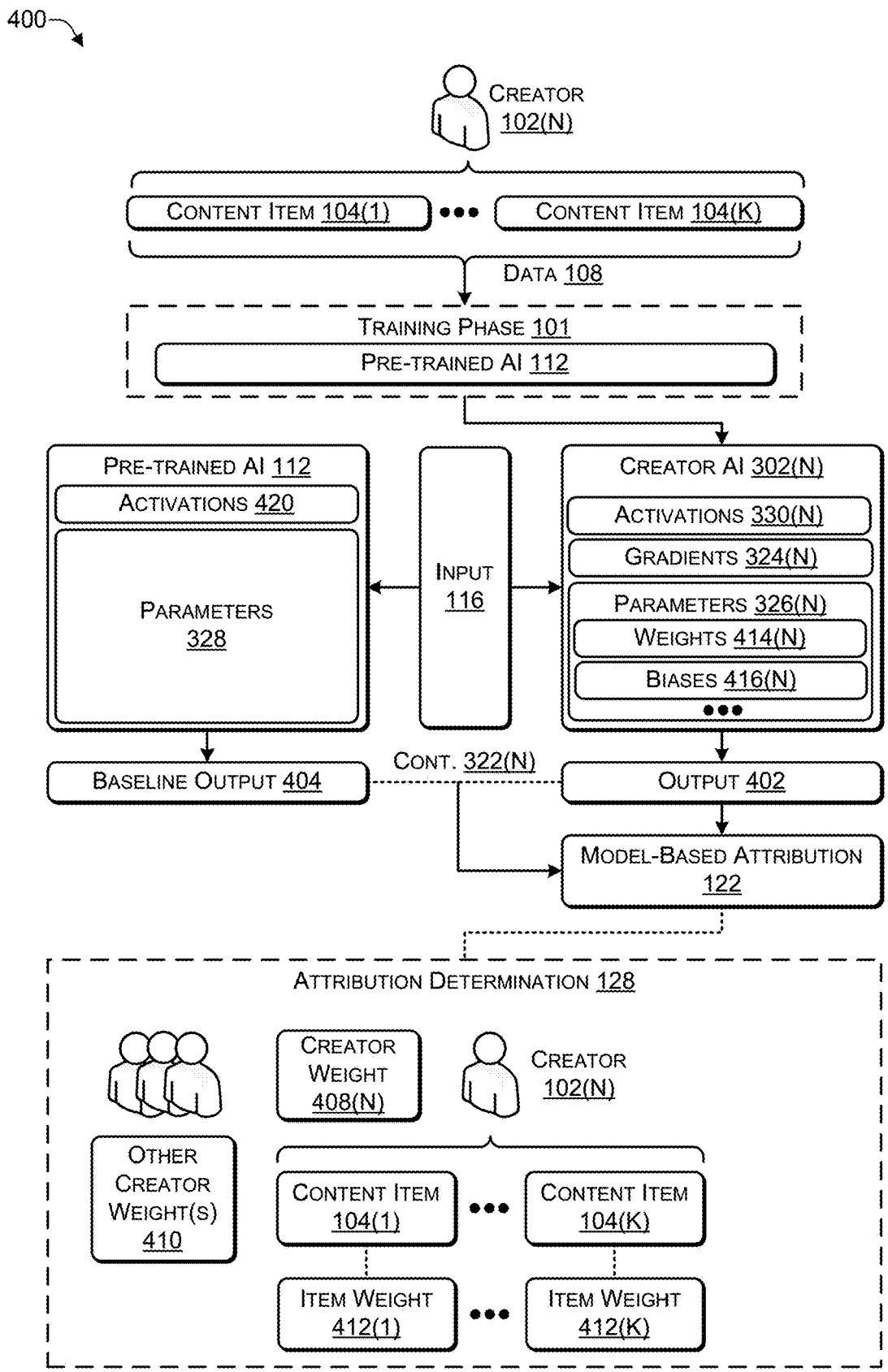
FIG. 4 is a block diagram of a system to perform model-based attribution, according to some embodiments.

FIG. 4 is a block diagram of a system 400 to perform model-based attribution, according to some embodiments. The system 400 describes the model-based attribution 122 of FIGS. 1, 2, and 3.

For a content creator 102(N), the model-based attribution 122 may create a machine learning model creator AI 302(N) based on training the AI 112 using the content items 104(1) to 104(K) (0<K<=P). The AI 112 is the base model, e.g., trained with a public dataset and not trained using any of the content items 104. The model-based attribution 122 may determine the contribution of the creator 102(N) to the creator AI 302(N) by comparing (1) an output 402 of the creator AI 302(N) to (2) a baseline output 404 of the AI 112. In some cases, the model-based attribution 122 may determine a relative contribution of each content item 104 during the training of the AI 112 to create the creator AI 114. For example, the model-based attribution 122 may track, store, and aggregate the contribution of individual content items 104(1) to 104(K) on gradients 324(N) during the training phase 101. The contribution 322(N) of each of the content items 104 is a difference between the parameters 326(N) (of the creator AI 302(N)) and the parameters 328 (of the pre-trained AI 112). Gradient tracking is further described in FIGS. 6A, 6B, 7A, and 7B.

The model-based attribution 122 may determine an overall influence (contribution) of the creator 102(N) for a generated output 402. The parameters 326, 328 may include values of a neural network such as, for example, weights and biases. To illustrate, the parameters 326(N) may include weights 414(N), biases 416(N), other AI-related parameters, or any combination thereof. The model-based attribution 122 may determine an influence of individual content items 104(1) to 104(K) on the weights 414(N). For example, the model-based attribution 122 may determine an item weight 412 associated with individual content items 104, e.g., content item 104(1) has item weight 412(1) and content item 104(k) has item weight 412(K)). For a particular input 116 (e.g., prompt), the model-based attribution 122 may determine activations 330(N) based on each weight of the weights 414(N). A difference between (i) activations 330(N) (of the creator AI 302(N)) and (ii) activations 420 (of the pre-trained AI 112) may be summed to determine an overall contribution of creator 102(N) to the output 402. Changes to weights 414(N) caused by content items 104 multiplied by their respective activations 330(N) results in determining a relative contribution of the content items 104(1) to 104(K). In this way, the attribution determination 128 may determine a creator weight 408(N) associated with individual creator 102(N) and determine other creator weights 410. For example, a particular creator 102(M) (0<M<=N) may have creator weight 408(N) and the remaining creators may have other creator weights 410.

The system 400 takes a pre-trained (e.g., using public domain data sets) machine learning model (also referred to herein as a model or an AI), the pre-trained AI 112 (MLMbase) and, in the training phase 101, trains the AI 112 using content items 104 associated with individual creators 102(1) to 102(N). For each creator 102(N), the system 400 creates a trained creator AI 302(N) that is trained using content created by creator 102(N). The system 400 determines the contribution of creator 102(N) to the base machine learning model (the pre-trained AI 112) by comparing the pre-trained AI 112 with the creator AI 302(N). The system 400 may determine a relative contribution of each content item 104(1) to 104(K) created by creator 102(N) and aggregate the contributions to determine a contribution 322(N) of creator 102(N). For example, if the creator 102 has created content items 104(1) to 104(k) (k>0) then, during the training phase 101, the system 400 may track, store, and aggregating the influence of each content item 104(1) to 104(k) on gradients of creator AI 302(N) (e.g., MLMi associated with creator 102(N)). The difference in parameters of the creator AI 302(N) (MLMi) and the pre-trained AI 112 (MLMbase) may be used to determine an attribution of individual creators 102. Parameters 326 refer to values of a neural network that are learned during the training phase 101 and may include weights 414 and biases 416. For example, during the training phase 101, changes to the weights 414(N) caused by content items 104(1) to 104(k) may be multiplied by their respective activations 330(N) (Vi) to determine a relative contribution of the content items 104(1) to 104(k). In this way, the system 400 may determine the attribution of the individual content creator 302(N). Of course, in some cases, one creator AI 302(N) may be trained for each creator 102(N) while in other cases one model, the AI 114 of FIG. 1 (MLMAll) may be trained for all the content creators 102(1) to 102(N). The model-based attribution 122 may use MLMBase (AI 112), MLMi (creator AI 302(N)), MLMAll (AI 114), or any combination thereof to determine attribution.

Determining the difference between MLMi (creator AI 302(N)) and MLMbase (AI 112) or between MLMAll (AI 114) and MLMbase (AI 112) may be done in several different ways. For example, after generating the output 402 in response to the input 116 using the creator AI 302(N) or the AI 114, the system 400 determines the largest similarity (proximity), the smallest distance d_i, or another measure of similarity among all the content items 104(1) to 104(k) used to train the creator AI 302(N) and the output 402. The similarity (proximity) measurement may be determined using embeddings of the particular content items 104 that were considered using, for example, transformer networks. Additionally, the same input 116 may be fed into the AI 112 (MLMbase) to create baseline output 404 (a reference item). The baseline output 404 (reference item) represents what would have happened to the input 116 if there had been no fine tuning to obtain the creator AI 302(N) (or AI 114). The systems and techniques may determine the smallest distance d_base between the baseline output 404 (reference item) and the data set 108 used to train the AI 112 to create the creator AI 302(N). In this example, d_i represents a uniqueness of the output of the creator AI 302(N) (MLMi) compared to the baseline output 404 (d_base). The difference between baseline output 404 (d_base) and the output 402 (d_i) indicates how much more unique the creator AI 302(N) (MLMi) is compared to AI 112 (MLMbase). Similarly, the difference between the baseline output 404 (d_base) and the output 118 (d_all) indicates a uniqueness of the AI 114 (MLMAll) compared to the AI 112 (MLMbase). In this way, another metric for model-based attribution may be determined, e.g., a transformativeness factor (TF) of the AI 112 (MLMbase). TF may be determined as the relative increase of the distance d_i (or d_all) compared to d_base and represents how much the fine-tuning contributed to creating creator AI 302(N) (MLMi) from AI 112 (MLMbase), resulting in the generation of a more unique output 402 (derivative content item) for the input 116. In addition, the system 400 may determine a range of TF values by using this technique for a range of different inputs 116 (e.g., using multiple different seeds). By averaging the resulting TF values, the system 400 may determine an accurate assessment of how transformative the training phase 101 (fine-tuning) was for the AI 112.

In addition to the relative transformativeness factor (TF), the system 400 may use the absolute uniqueness of the output 402 generated by the model the creator AI 302(N) (MLMi) or the AI 114 (MLMAll) using the input 116. The absolute uniqueness may be determined by determining the smallest distance, largest similarity, or both among all content items 104 from the data set 108 that were used to train AI 112 (MLMbase). In some cases, the absolute uniqueness value and the relative transformativeness factor (TF) may be combined with the other model-based attribution techniques described herein. After the training phase 101 has been completed, for a particular input 116, the comparison between (i) the activations 330(N) (Vi) from the creator AI 302(N) (MLMi) or the AI 114 (MLMAll) and (ii) the activations 420 (Vbase) from the AI 112 (MLMbase) may be used to determine the model-based attribution 122. When the output 402 is generated, each of the weights 414 may be activated differently. The activated output of the weights 414 are the activations 330. The contribution that each content item 104 has on each weight 414 during the training phase 101 may be multiplied with the activation 330 of each respective weight 414 during generation of the output 402 (inference). By averaging the resulting multiplied values for each content item, the attribution of each content item 104 on the resulting output 402 may be determined.

Thus, an AI trained using public data sets may be further trained ("fine tuned") using a set of content items to create a generative AI capable of generating derivative content. During training, the influence of the content items on the generative AI may be determined. The influence may be aggregated for each content creator to determine a static attribution vector that identifies how much each creator's content contributed to shaping the learning of the generative AI. After the training phase is complete, the generative AI is placed online (e.g., in service) and may receive input from a user (e.g., derivative content creator). The generative AI uses the input to generate an output that includes derivative content derived from the training content. For model-based attribution, the changes caused by the training material (content items) to the AI during the training phase are used to determine a static attribution vector. When the trained AI is online and produces an output in response to receiving an input, the trained AI gathers information regarding (1) which creators are influencing the output and (2) to what extent (amount) each creator is influencing the output. The gathered information is used to create a dynamic attribution vector. The static attribution vector, the dynamic attribution vector, or both may be used to determine attribution and to provide compensation to the creators.

Figure 5A:
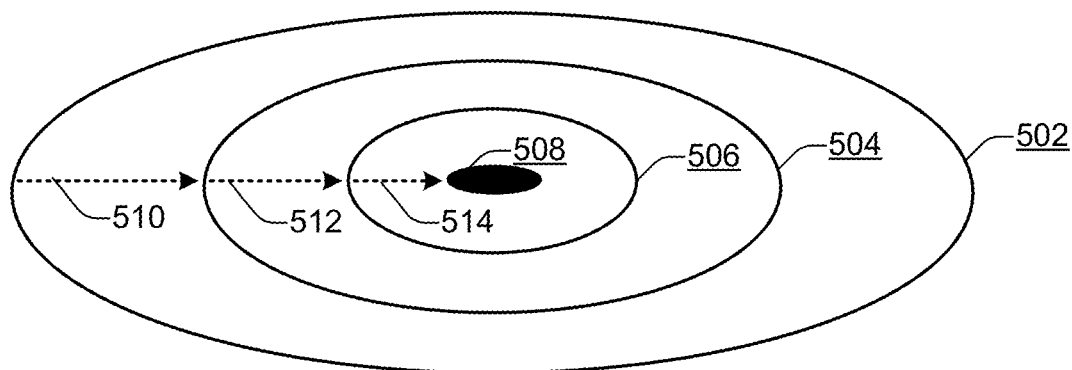
FIG. 5A illustrates a batch gradient descent, according to some embodiments.
Figure 5B:
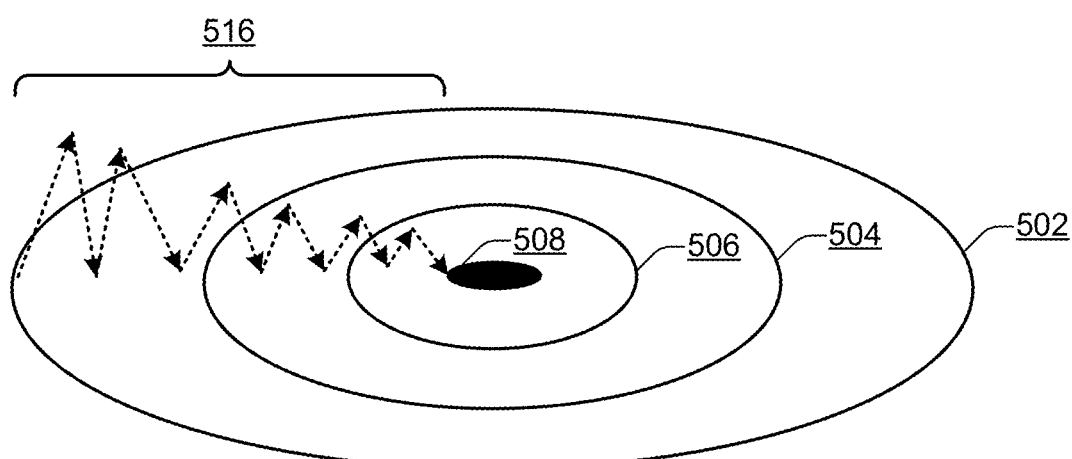
FIG. 5B illustrates a stochastic gradient descent, according to some embodiments.

FIGS. 5A and 5B illustrate two types of converging functions that may be used. It should be understood that these are merely examples and that other types of converging functions may be used. FIG. 5A illustrates a batch gradient descent and FIG. 5B illustrates a stochastic gradient descent, according to some embodiments. The model-based attribution 122 of FIG. 1 determines an influence of each content creator 102 on the generative AI 114. For example, a creator 102 may have significant influence on a generative AI 114 but less influence for a particular output 118 based on a particular input 116. The training data 108 and the resulting trained model (generative AI 114) is used to determine attribution. The model-based attribution 122 determines how much influence the training data 108 has on the generative AI 114. For example, the influence of individual creators 102 on the output 118 may not be obvious but that influence is nonetheless present because of the training 110. For example, the input 116 and resulting output 118 may be for something ("cat") outside the realm of the training data 108 but the training data 108 still influences the output 118.

The model-based attribution 122 determines the attribution vector 136 based on the trained generative AI ("model"). In some cases, the model-based attribution 122 may not take into account the input 116 nor the output 118. The model-based attribution 122 determines the influence of individual creators 102 that occurs to the AI 112 during the training 110 to create the generative AI 114.

One technique to perform model-based attribution 122 is by tracking gradients (e.g., gradients 324 of FIGS. 3 and 4), based on the way that the AI 114 is trained. The model-based attribution 122 may track the change in parameters (e.g., parameters 326 of FIGS. 3 and 4). The model-based attribution 122 may track how much the AI 114 (e.g., neural network) changes (e.g., as compared to the AI 112) during training 110. For example, the model-based attribution 122 may, during training 110, provide the AI 112 a set of content items 104 (e.g., also called a batch) and then determine a gradient. The gradient reflects the influence of the set of content items 104. As the training 110 progresses, the model-based attribution 122 tracks how much the gradient changes.

In a neural network (a type of AI algorithm), the gradient descends towards a local minimum (part of training a neural network). The neural network uses a minimize loss function to determine how close the output of the neural network is to a desired output. The gradient maps to a weight so the model-based attribution may check either the gradient or the weight. The model-based attribution 122 determines the values of the weights that enable the AI to generate content (output) that is similar to a desired content (as specified by the input) as possible. In the examples provided herein, the input 116 is text (or text-based) and the training uses billions of (text, image) pairs. The input 116 instructs the AI 114 which of the weights 414 to use (e.g., which neurons to fire in a neural network), causing a subset of the weights 414 to be triggered. The influence of each creator 102 is determined by determining how much the subset of the weights 414 changed during the training 110 for individual creators 102.

Another technique to perform model-based attribution 122 is to determine a distance between training embeddings (e.g., clustering). The further a particular embedding is from other embeddings, the more unique the particular embedding. In this way, a particular creator that provides content that includes relatively uncommon and/or unique content is given a higher weight than other creators and receives a higher attribution. A second creator that provides content that is similar to the content of other creators receives a lower weight and therefore lower attribution because the second creator is not contributing as much to the training data. Similarly, a third creator whose content items tend to have similar characteristics, e.g., there is not much variation from one content item to another receives a lower weight and a lower attribution as the content creator is not contributing much to the training data.

The circles 502, 504, 506 represent configurations where the loss of the neural network during training is identical, similar to the lines and/or circles on topographic maps (where lines/circles represent areas of the same height). The term configuration means the specific values the parameters (e.g., weights, biases and the like) of the neural network. The goal during the training 110 is to change a particular configuration such that the resulting loss becomes lower, eventually approaching a minimum 508, shown in the middle of the circles 502, 504, 506. Using gradient descent, the configuration is modified such that the loss goes down from one circle to another until the configuration (e.g., circle 506) approaches a lowest "altitude", e.g., a lowest loss (minimum 508). The gradient indicates a direction in which to change the parameters to approach the minimum 508. The arrows 510, 512, 514 are visualizations of the gradients indicating where to move to reduce the loss.

Different gradient techniques may be used. Depending on the particular gradient technique that is used, a direct path, as illustrated in FIG. 5A, may be taken to approach the loss minimum 508. Sometimes the gradients may not point directly at the smallest loss, as illustrated by the path 516 in FIG. 5B, resulting in the training process meandering somewhat, with each epoch (training pass) having a lower loss, but more steps being used until the minimum is reached. The direction and magnitude of gradients for each data point may be determined separately (e.g., stochastic gradient descent) or in batches (with each batch including a set of similar content). The model-based attribution 122 determines how much each data point (content item 104) helped the AI 114 move towards the minimum 508.

The content items 104 may be analogized as being similar to a participant in a sports game (e.g., football, hockey, or the like). After the game, a determination is made as to which player (data point) made the biggest impact to the game. Each player (data point) is given a score indicating their contribution (e.g., directly scored, assisted, or the like) to scoring a goal. In AI training, the "goal" is reaching that minimum. In this way, individual content items 104 are given a score to indicate their contribution during the training 110 to create the AI 114.

The AI training process may be analogized as being similar to a traveler plotting a route from a starting location to a destination on a map. Each content item 104 is analogous to a step on the route. Some steps (content items 104) get the traveler closer to the destination (the global minimum 508) quicker, while others (of the content items 104) might cause the traveler to wander around a bit. After the journey, the traveler looks back and assign a value to each step (content item 104) based on how helpful it was. Just as certain parts of a journey stand out as being very helpful in getting to the destination, the model-based attribution 122 determines an influence of each data point (content items 104) in guiding (training) the AI 114 to its best performance.

During the training 110, each node in the neural network may be viewed as an activation point that responds variably to different content items 104. To capture this variability and inherent relationship, a probability distribution may be assigned to each node. This distribution represents the likelihood of each content item 104 being a significant influencer for that particular node. When the AI 114 generates the output 118 and particular nodes are activated, the distributions associated with those nodes may be sampled based on the probability values of each creator 102. By systematically aggregating the sampled scores across the activated nodes, the model-based attribution 122 determines a probabilistically-weighted set of attributions of the creators 102. This ensures that the contributions of each creator 102 to the generated output 118 are acknowledged in a statistically rigorous manner.

Gradient descent is an optimization (loss minimization) algorithm used to train a machine learning model, such as the AI 112. The training data 108 is used to train the machine learning model and the cost function within gradient descent determines the accuracy of the machine learning model during training with each iteration of parameter updates. Until the cost function is close to (or equal to) zero, the machine learning model continues to adjust its parameters to yield the smallest possible error. Similar to finding a line of best fit in linear regression, the purpose of gradient descent is to reduce the cost function (e.g., the error between predicted and actual performance). Two data points, including a direction and a learning rate may be used.

In batch gradient descent the error for each data point in a training set is summed and the machine learning model is updated after all training data has been evaluated. This process may be referred to as a training epoch or simply epoch. Batch gradient descent typically produces a stable error gradient and convergence, but sometimes the convergence point may be less than the most ideal and may find a local minimum rather than a global minimum.

In stochastic gradient descent, a training epoch is run for each content item in the training data, updating parameters of the AI for one content item at a time. Mini-batch gradient descent combines gradient descent and stochastic gradient descent. The training data 108 is grouped into small sets (called batches) and the AI is trained using those batches.

Figure 6A:
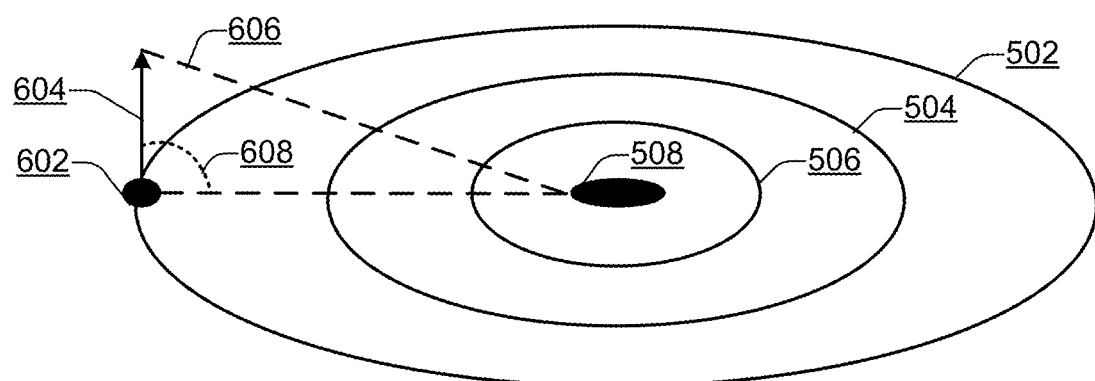
FIG. 6A illustrates determining a first attribution of a first content item during training, according to some embodiments.

FIG. 6A illustrates determining a first attribution of a first content item during training, according to some embodiments. For a data point 602 representing a first content item, the model-based attribution 122 may determine a gradient 604 and determine a distance 606 of the gradient 604 from the minimum 508 and determine an angle 608 of the gradient 604. The model-based attribution 122 uses the distance 606 and the angle 608 to determine the contribution of the first content item (data point 602) in progressing towards the minimum 508.

Figure 6B:
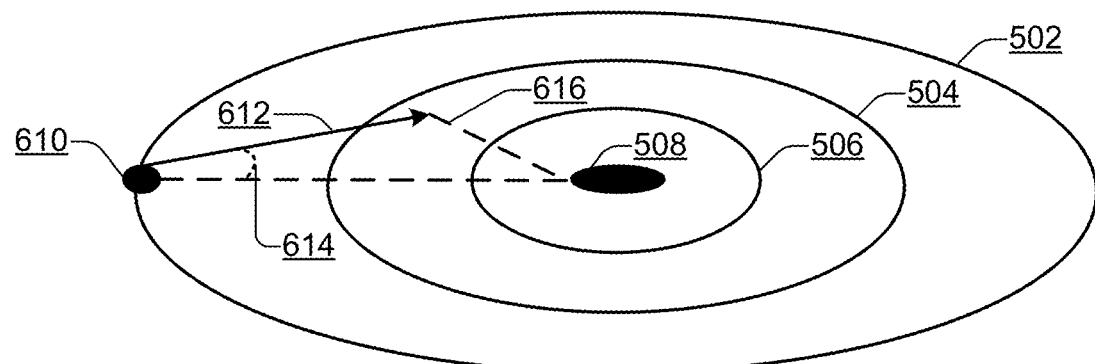
FIG. 6B illustrates determining a second attribution of a second content item during training, according to some embodiments.

FIG. 6B illustrates determining a second attribution of a second content item during training, according to some embodiments. For a data point 610 representing a second content item, the model-based attribution 122 may determine a gradient 612 and determine a distance 616 of the gradient 612 from the minimum 508 and determine an angle 614 of the gradient 612. The model-based attribution 122 uses the distance 616 and the angle 614 to determine the contribution of the second content item (data point 610) in progressing towards the minimum 508. Note that the distance 616 is less than the distance 606 (of FIG. 6A) and the angle 614 is less than the angle 608 (of FIG. 6A) indicating that the contribution of the second content item (data point 610) is less than the contribution of the first content item (data point 602).

Thus, the model-based attribution may determine a contribution of individual creators and individual (or batches of) content items by determining a distance of an embedding of the individual creator (or individual content item) to a next token in embedding space, or by computing a neighborhood density in embedding space The closer a new embedding is to an existing embedding, the less new information is added by that embedding, and therefore there is less of a contribution conversely by the creator or content item. In some cases, the model-based attribution may be combined with output-based attribution to create a more complete assessment of the influence of individual creators and/or individual content items. For example, the output-based influence may be weighted obtained using distances d1, d2, . . . and weighted with the distance to next token and/or the neighborhood density for the embedding of each creator or content item to prevent creators who produce content items that all tend to have a similar style from gaining a larger contribution.

Figure 7:
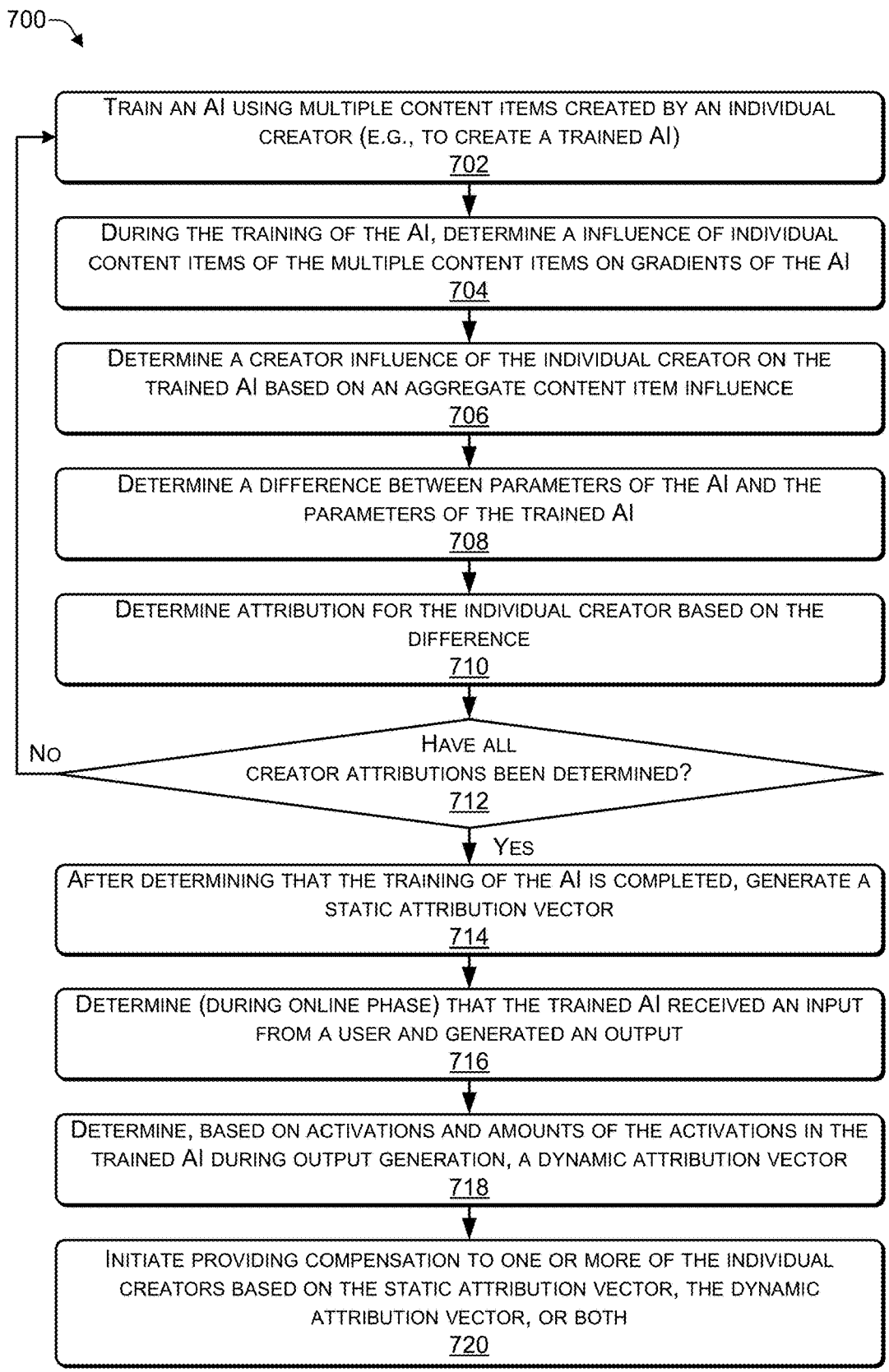
FIG. 7 is a flowchart of a process that includes determining an influence of content items during training of an artificial intelligence (AI), according to some embodiments.
Figure 8:
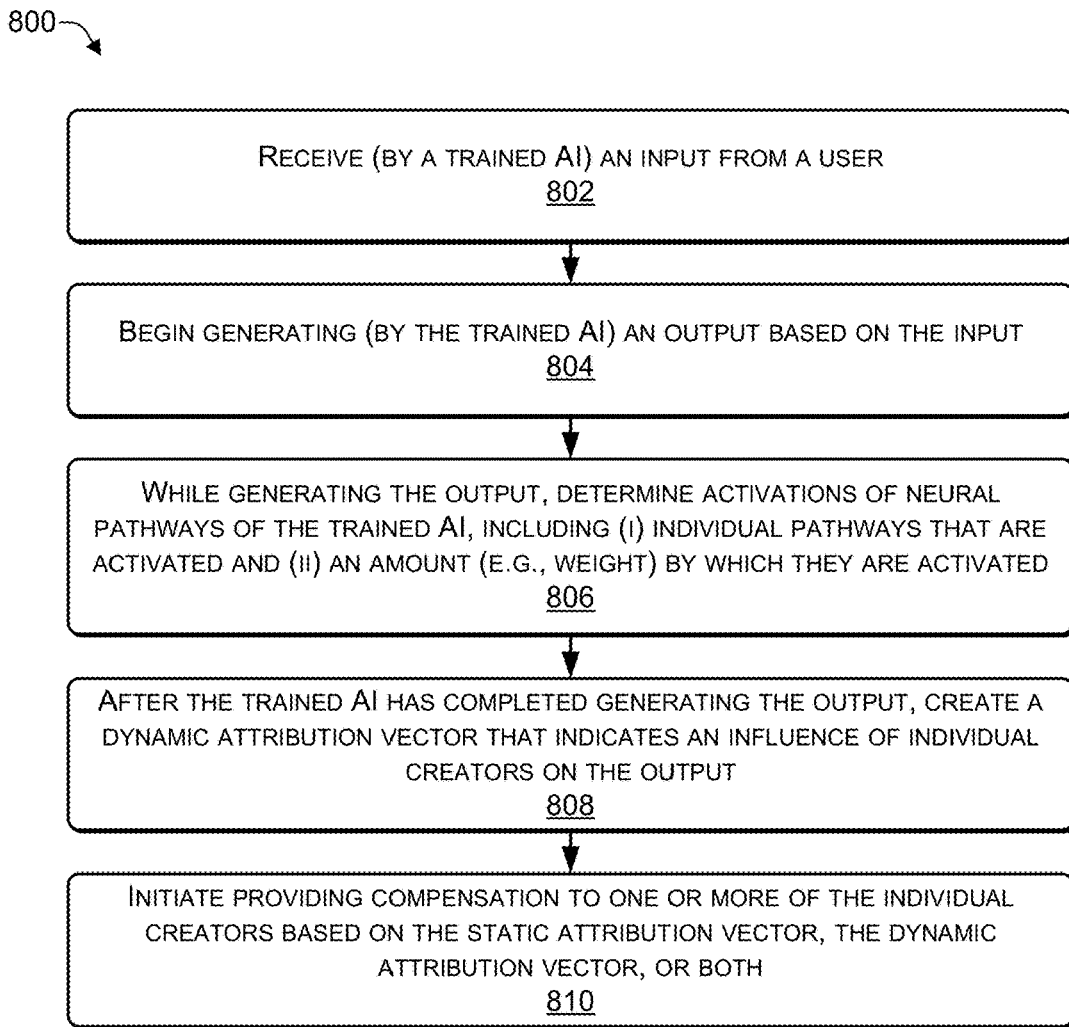
FIG. 8 is a flowchart of a process that includes determining activations and weights when an artificial intelligence (AI) is generating content, according to some embodiments.
Figure 9:
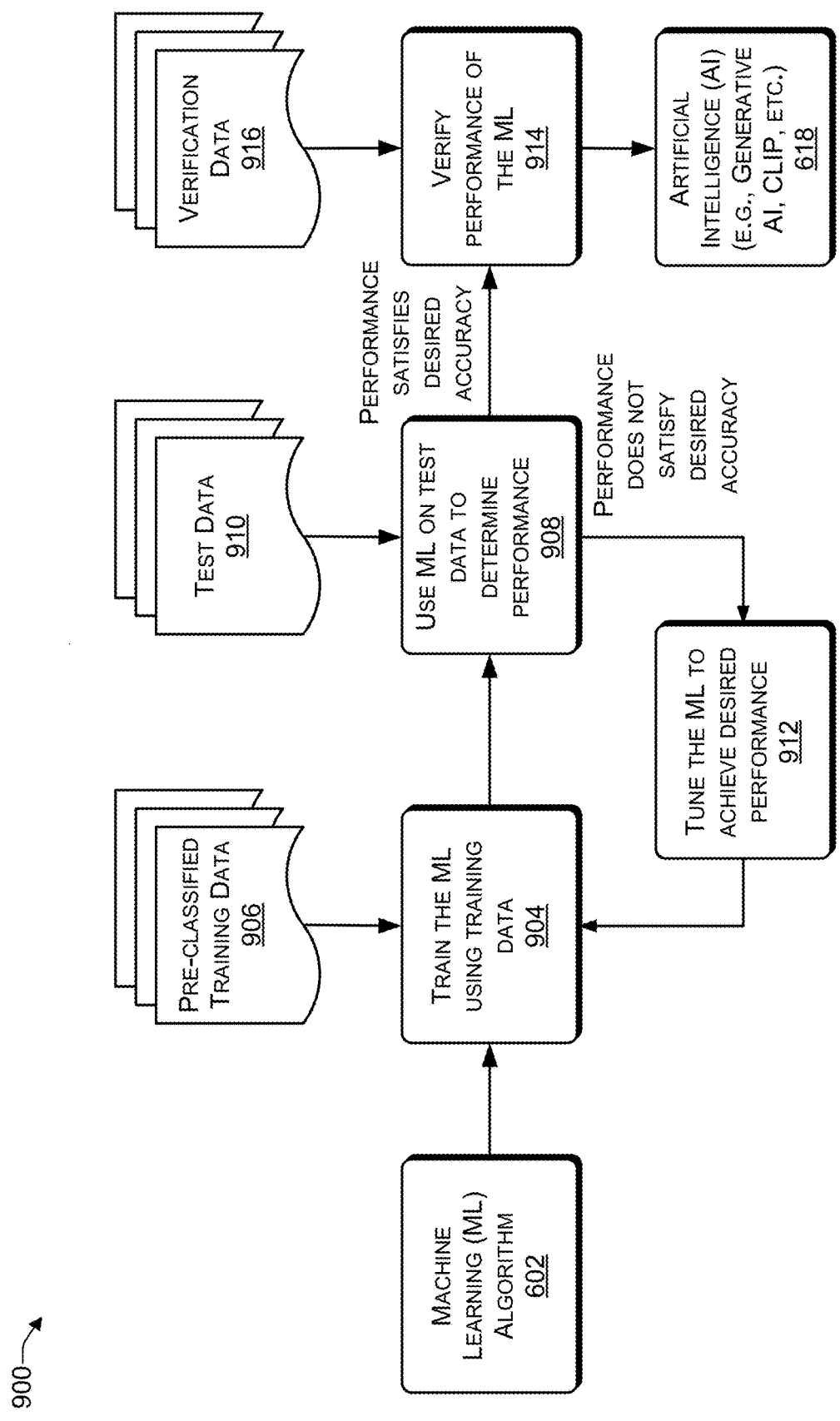
FIG. 9 is a flowchart of a process to train a machine learning algorithm, according to some embodiments.

In the flow diagram of FIGS. 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700. 800, and 900 are described with reference to FIGS. 1, 2, 3, 4, 5A, 5B, 6A, and 6B as described above, although other models, frameworks, systems and environments may be used to implement these processes.

FIG. 7 is a flowchart of a process 700 that includes determining an influence of content items on gradients during a training of an artificial intelligence (AI), according to some embodiments. For example, the process 700 may be performed by the model-based attribution 122. In some cases, 702, 704, 706, 708, 710, 712, 714 may be performed during the training phase 101 of FIG. 1. Furthermore, 716, 718 may be performed after the AI 114 has been trained and the AI 114 is online (and as further described in FIG. 8).

At 702, the process may train an AI using multiple content items created by multiple creators to create a trained AI. At 704, during the training, the process may determine an influence of individual content items on one or more parameters (e.g., weights) of the AI. At 706, during the training, the process may determine activations caused to individual parameters (e.g., weights) of the AI. At 708, the process may determine the contribution of an individual creator (of the multiple creators) by determining, for individual parameters, a difference between an activation of the AI and an activation of the trained AI. At 710, the process may determine the relative contribution of the multiple content items (of the individual creator) by multiplying (1) a change in the parameters (e.g., weights) of the trained AI caused by the multiple content items with (2) their respective activations. At 712, the process may determine whether the AI has determined an attribution for each content creator. If the process determines, at 712, that "no", an attribution has not been determined for all content creators, then the process may proceed to 702 to train the AI using multiple content items created by another individual creator. If the process determines, at 712, that "yes", an attribution has been determined for all content creators, then the process may proceed to 714 (e.g., training is complete). At 714, after the training the AI to create the trained AI is completed, the process may generate a static attribution vector. For example, in FIG. 4, during the training phase 101, the model-based attribution 122 may determine an influence of individual content items 104 on one or more parameters 326(N) (e.g., weights) of the AI 302(N). The model-based attribution 122 may determine activations 330(N) caused to individual parameters 326(N) of the creator AI 302(N). The model-based attribution 122 may determine the contribution of the individual creator 102(N) by determining, for individual parameters 326(N), a difference between the activations 420 and the activations 330(N). The model-based attribution 122 may determine the relative contribution of the multiple content items 104 (of the creator 102(N)) by multiplying (a) a change in the parameters 326(N) of the AI 302(N) caused by the multiple content items 104 with (b) their respective activations 330(N). The model-based attribution 122 may perform the attribution determination for individual creators 102(1) to 102(N), until all N creators and their corresponding content items 104 have been used during the training 110 to create the generative AI 114 to create the static attribution vector 136.

At 716, the process may determine that the trained AI received an input from a user and generated an output (e.g., derivative content). At 718, the process may determine (during an online phase) a dynamic attribution vector, based on activations and amounts (weights) of the activations that occur during output generation. Determining the dynamic attribution vector is described further in FIG. 8. At 720, the process may initiate providing compensation to one or more of the individual creators based on the static attribution vector, the dynamic attribution vector, or both. For example, in FIG. 1, after the generative AI 114 receives the input 116, the generative AI 114 may monitor the activations and corresponding amounts in the neural pathways when producing the output 118 to create the dynamic attribution vector 137. The model-based attribution 122 may initiate providing compensation 130 to the creators 102 based on the static attribution vector 136, the dynamic attribution vector 137, or both.

Thus, an AI is trained ("fine tuned") using a set of content items to create a trained AI capable of generating derivative content. During training, the influence of the content items on the generative AI may be determined. The influence may be aggregated for each content creator to determine a static attribution vector that identifies how much each creator's content contributed to shaping the learning of the generative AI. After the training phase is complete, the generative AI is placed online (e.g., in service) and may receive input from a user (e.g., derivative content creator). The generative AI uses the input to generate an output that includes derivative content derived from the training content. When producing the output, the trained AI gathers information regarding (1) which creators are influencing the output and (2) to what extent (amount) each creator is influencing the output. The gathered information is used to create a dynamic attribution vector. The static attribution vector, the dynamic attribution vector, or both may be used to determine attribution and to provide compensation to the creators.

FIG. 8 is a flowchart of a process 800 that includes determining activations and weights when an artificial intelligence (AI) is generating content, according to some embodiments. The process may be performed by the AI 114 of FIGS. 1, 2, 3, and 4 when the AI 114 is online ("online phase").

At 802, the process (a trained AI) may receive an input from a user. At 804, the process (the trained AI) may begin generating an output based on the input. At 806, while generating the output, the process may determine (i) activations of neural pathways in the trained AI and (ii) an amount (weight) of individual activations. At 808, after the trained AI has completed generating the output, the process may create a dynamic attribution vector that indicates an influence of individual creators on the output. At 810, the process may initiate providing compensation to one or more of the individual creators based on the static attribution vector, the dynamic attribution vector, or both. For example, in FIG. 3, the AI 114 may determine the activations 330, the gradients 324, the parameters 326, or any combination thereof that occur in the generative AI 114 during the training 110 to determine the static attribution vector. The AI 114 may determine the activations 330, the gradients 324, the parameters 326, or any combination thereof that occur when generating the output 118 (after receiving the input 116) and create the dynamic attribution vector 137 based on the determinations. The model-based attribution 122 may initiate providing compensation to the creators 102 based on the static attribution vector 136, the dynamic attribution vector 137, or both.

Thus, when training an AI, the influence of the content items on the AI may be determined. The influence may be aggregated for each content creator to determine a static attribution vector that identifies how much each creator's content contributed to shaping the learning of the AI to create a generative AI. After the training phase is complete, the generative AI is placed online. The generative AI uses input from a user to generate an output that includes derivative content derived from the training content. When producing the output, the trained AI gathers information regarding (1) which creators are influencing the output and (2) to what extent (amount) each creator is influencing the output. The information that is gathered is used to create a dynamic attribution vector. The static attribution vector, the dynamic attribution vector, or both may be used to determine attribution and to provide compensation to the creators.

FIG. 9 is a flowchart of a process 900 to train a machine learning algorithm, according to some embodiments. For example, the process 900 may be performed after the training phase 101 of FIG. 1, when the AI 114 is placed online to generate the output 118 (derivative content) in response to receiving the input 116.

At 902, a machine learning algorithm (e.g., software code) may be created by one or more software designers. For example, the generative AI 112 of FIGS. 1 and 3 may be created by software designers. At 904, the machine learning algorithm may be trained (e.g., fine-tuned) using pre-classified training data 906. For example, the training data 906 may have been pre-classified by humans, by machine learning, or a combination of both. After the machine learning has been trained using the pre-classified training data 906, the machine learning may be tested, at 908, using test data 910 to determine a performance metric of the machine learning. The performance metric may include, for example, precision, recall, Frechet Inception Distance (FID), or a more complex performance metric. For example, in the case of a classifier, the accuracy of the classification may be determined using the test data 910.

If the performance metric of the machine learning does not satisfy a desired measurement (e.g., 95%, 98%, 99% in the case of accuracy), at 908, then the machine learning code may be tuned, at 912, to achieve the desired performance measurement. For example, at 912, the software designers may modify the machine learning software code to improve the performance of the machine learning algorithm. After the machine learning has been tuned, at 912, the machine learning may be retrained, at 904, using the pre-classified training data 906. In this way, 904, 908, 912 may be repeated until the performance of the machine learning is able to satisfy the desired performance metric. For example, in the case of a classifier, the classifier may be tuned to be able to classify the test data 910 with the desired accuracy.

After determining, at 908, that the performance of the machine learning satisfies the desired performance metric, the process may proceed to 914, where verification data 916 may be used to verify the performance of the machine learning. After the performance of the machine learning is verified, at 914, the machine learning 902, which has been trained to provide a particular level of performance may be used as an artificial intelligence (AI) 918. For example, the AI 918 may be the (trained) generative AI 114 described herein.

Figure 10:
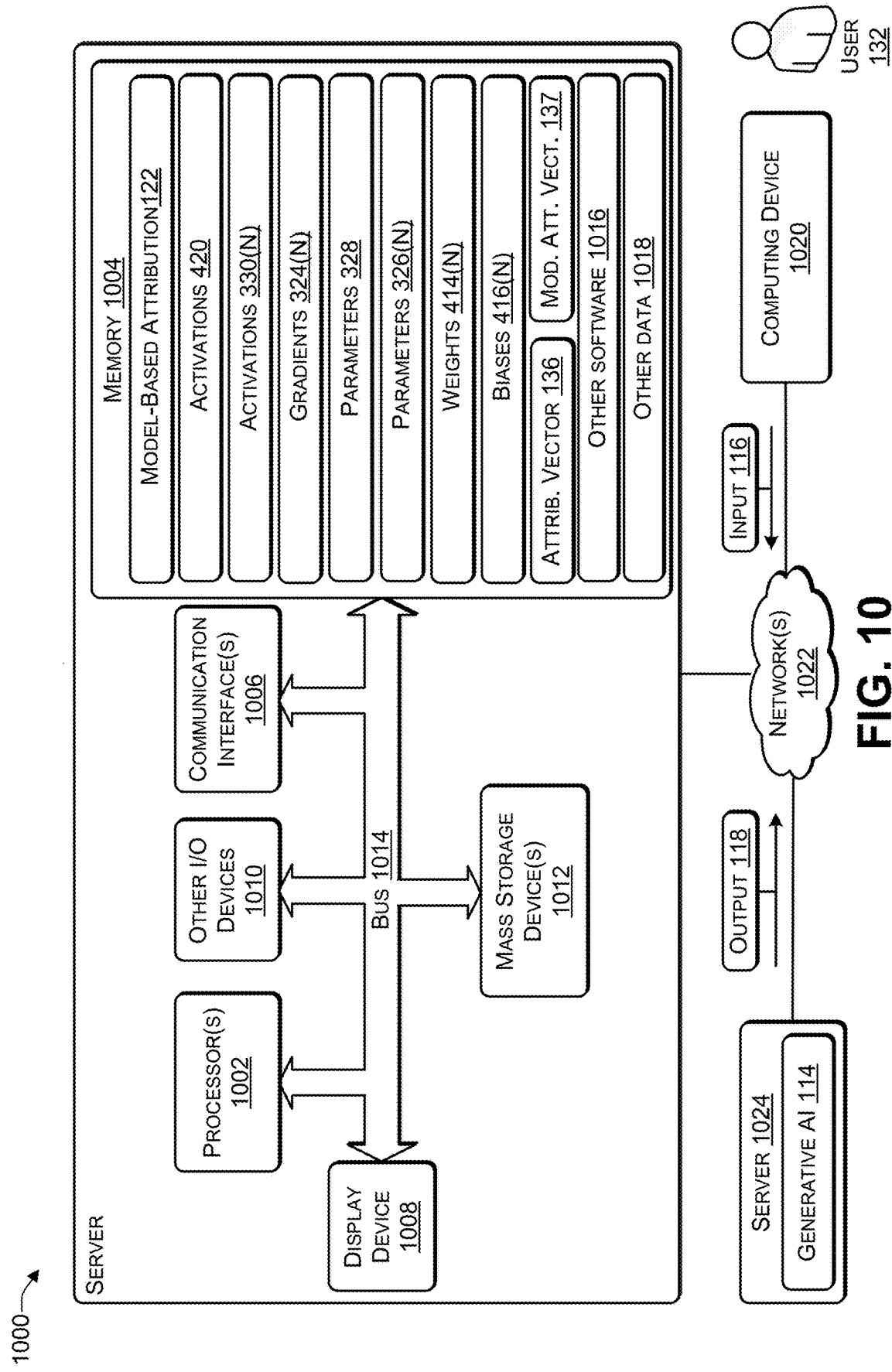
FIG. 10 illustrates an example configuration of a computing device that can be used to implement the systems and techniques described herein.

FIG. 10 illustrates an example configuration of a device 1000 that can be used to implement the systems and techniques described herein. For example, the device 1000 may be a server (or a set of servers) used to host one or more of the components described in FIGS. 1, 2, 3, 4, and 5. In some cases, the systems and techniques described herein may be implemented as an application programming interface (API), a plugin, or another type of implementation.

The device 1000 may include one or more processors 1002 (e.g., central processing unit (CPU), graphics processing unit (GPU), or the like), a memory 1004, communication interfaces 1006, a display device 1008, other input/output (I/O) devices 1010 (e.g., keyboard, trackball, and the like), and one or more mass storage devices 1012 (e.g., disk drive, solid state disk drive, or the like), configured to communicate with each other, such as via one or more system buses 1014 or other suitable connections. While a single system bus 1014 is illustrated for ease of understanding, it should be understood that the system bus 1014 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), high definition media interface (HDMI), and the like), power buses, etc.

The processors 1002 are one or more hardware devices that may include a single processing unit or a number of processing units, all of which may include single or multiple computing units or multiple cores. The processors 1002 may include a graphics processing unit (GPU) that is integrated into the CPU or the GPU may be a separate processor device from the CPU. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., random access memory (RAM), read only memory (ROM), or the like) devices. Further, mass storage devices 1012 may include hard disk drives, solid-state drives, removable media, including external and removable drives, memory cards, flash memory, floppy disks, optical disks (e.g., compact disc (CD), digital versatile disc (DVD), a storage array, a network attached storage (NAS), a storage area network (SAN), or the like. Both memory 1004 and mass storage devices 1012 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The device 1000 may include one or more communication interfaces 1006 for exchanging data via the network 110. The communication interfaces 1006 can facilitate communications within a wide variety of networks and protocol types, including wired networks (e.g., Ethernet, Data Over Cable Service Interface Specification (DOCSIS), digital subscriber line (DSL), Fiber, universal serial bus (USB) etc.) and wireless networks (e.g., wireless local area network (WLAN), global system for mobile (GSM), code division multiple access (CDMA), 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1010 may be devices that receive various inputs from a user and provide various outputs to the user, and may include a keyboard, a touchpad, a mouse, a gaming controller (e.g., joystick, steering controller, accelerator pedal, brake pedal controller, virtual reality (VR) headset, VR glove, or the like), a printer, audio input/output devices, and so forth.

The computer storage media, such as memory 1004 and mass storage devices 1012, may be used to store any of the software and data described herein, including, for example, the model-based attribution 122, the attribution vector 136, other software 1016, and other data 1018.

The user 132 (e.g., secondary creator) may use a computing device 1020 to provide the input 116, via one or more networks 1022, to a server 1024 that hosts the generative AI 114. Based on the input 116, the server 1024 may provide the output 118. The device 1000 may be used to implement the computing device 1020, the server 1024, or another device.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  determining, by one or more processors, that a training of an artificial intelligence has been completed, to create a trained artificial intelligence;
  determining, by the one or more processors, an attribution vector created during the training of the artificial intelligence;
  determining, by the one or more processors, that the trained artificial intelligence has received an input;
  generating, by the trained artificial intelligence, an output based on the input;
  while generating the output based on the input, determining:
    activations of neural pathways in the trained artificial intelligence; and
    an amount of individual activations;
  after determining that the trained artificial intelligence has completed generating the output, creating a dynamic attribution vector based on the activations of the neural pathways and the amount of the individual activations, the dynamic attribution vector indicating an influence of individual content creators on the output;
  modifying the attribution vector based at least in part on the dynamic attribution vector;
  determining, by the one or more processors, an attribution determination for individual content creators of multiple content creators based on the attribution vector and based on determining one or more of the multiple content creators that contributed at least a threshold amount during the training, wherein a particular creator having a contribution less than the threshold amount does not receive a creator attribution; and initiating, by the one or more processors, providing compensation to one or more of the multiple content creators based at least in part on the attribution determination;

wherein training the artificial intelligence to create the trained artificial intelligence comprises:
- selecting a content creator from multiple content creators to create a selected content creator;
- selecting a plurality of content items associated with the selected content creator to create selected content items;
- training the artificial intelligence using the selected content items;
- determining a measure of a proximity between:
  - the artificial intelligence trained using the selected content items, and the artificial intelligence prior to initiating the training;
  - determining a creator influence of the content creator on the trained artificial intelligence based at least in part on the measure of the proximity; and
  - including the creator influence in the attribution vector.

2. The method of claim 1, further comprising:
determining a transformativeness factor of the trained artificial intelligence relative to the artificial intelligence based at least in part on the measure of the proximity; and
determining the attribution vector based at least in part on the transformativeness factor.

3. The method of claim 1, further comprising:
determining a change caused by individual content items of the selected content items associated with the selected content creator to weights of the artificial intelligence during the training;
determining a number of activations caused by individual content items of the selected content items; and
determining a contribution of the selected content creator based at least in part on multiplying the change to the weights by the number of activations.

4. The method of claim 1, further comprising:
determining a contribution of individual content items of the selected content items associated with the selected content creator on gradients of the artificial intelligence during the training;
aggregating contributions of the selected content items; and
determining a contribution of the selected content creator based at least in part on the aggregating.

5. The method of claim 1, wherein the training further comprises:
determining a content item influence of individual content items of the plurality of content items associated with the content creator using a converging function comprising a loss minimization algorithm that uses a direction and a learning rate to reduce a cost function close to zero.

6. The method of claim 1, wherein the training further comprises:
determining a number of activations caused to individual parameters of the artificial intelligence;
determining a relative contribution of the selected content items of individual content creators based at least in part on a change in parameters of the trained artificial intelligence caused by the multiple content items with their respective activations;
after completing the training to create the trained artificial intelligence, generating a static attribution vector based on the relative contribution of the selected content items of individual content creators; and
creating the attribution vector based at least in part on the static attribution vector.

7. The method of claim 1, further comprising:
storing the attribution vector in a blockchain.

8. A server comprising:
one or more processors; and
a non-transitory memory device to store instructions executable by the one or more processors to perform operations comprising:
determining that a training of an artificial intelligence has been completed, creating a trained artificial intelligence;
determining an attribution vector created during the training of the artificial intelligence;
determining that the trained artificial intelligence has received an input;
generating, by the trained artificial intelligence, an output based on the input;
determining an attribution determination for individual content creators of multiple content creators based on the attribution vector and based on identifying one or more of the multiple content creators that contributed at least a threshold amount during the training, wherein a particular creator having a contribution less than the threshold amount does not receive a creator attribution; and
initiating providing compensation to one or more of the multiple content creators based at least in part on the attribution determination;
wherein training the artificial intelligence to create the trained artificial intelligence comprises:
- selecting a content creator from multiple content creators to create a selected content creator;
- selecting a plurality of content items associated with the selected content creator to create selected content items;
- training the artificial intelligence using the selected content items;
- determining a measure of a proximity between:
  - the artificial intelligence trained using the selected content items, and
  - the artificial intelligence prior to initiating the training;
- determining a creator influence of the content creator on the trained artificial intelligence based at least in part on the measure of the proximity;
- determining a content item influence of individual content items of the plurality of content items associated with the content creator using a converging function comprising a loss minimization algorithm that uses a direction and a learning rate to reduce a cost function close to zero; and
- including the creator influence and the content item influence in the attribution vector.

9. The server of claim 8, the operations further comprising:
determining a transformativeness factor of the trained artificial intelligence relative to the artificial intelligence based at least in part on the measure of the proximity; and determining the attribution vector based at least in part on the transformativeness factor.

10. The server of claim 8, the operations further comprising:
while generating the output, determining:
activations of neural pathways in the trained artificial intelligence; and
an amount of individual activations.

11. The server of claim 10, the operations further comprising:
after determining that the trained artificial intelligence has completed generating the output, creating a dynamic attribution vector based on the activations of the neural pathways and the amount of the individual activations, the dynamic attribution vector indicating an influence of the individual content creators on the output; and
creating the attribution vector based at least in part on the dynamic attribution vector.

12. The server of claim 8, the operations further comprising:
storing the attribution vector in a blockchain.

13. The server of claim 8, wherein the training further comprises:
determining a contribution of individual content items of the selected content items associated with the selected content creator on gradients of the artificial intelligence during the training;
aggregating contributions of the selected content items; and
determining a contribution of the selected content creator based at least in part on the aggregating.

14. The server of claim 8, wherein the training further comprises:
determining a change caused by individual content items of the selected content items associated with the selected content creator to weights of the artificial intelligence during the training;
determining a number of activations caused by individual content items of the selected content items; and
determining a contribution of the selected content creator based at least in part on multiplying the change to the weights by the number of activations.

15. A non-transitory computer-readable memory device to store instructions executable by one or more processors to perform operations comprising:
determining that a training of an artificial intelligence has been completed, creating a trained artificial intelligence;
after determining that the training of the artificial intelligence has been completed, generating a static attribution vector based on a relative contribution of selected content items of individual content creators;
determining an attribution vector created during the training of the artificial intelligence, the attribution vector created based at least in part on the static attribution vector;
determining that the trained artificial intelligence has received an input;
generating, by the trained artificial intelligence, an output based on the input;
determining an attribution determination for individual content creators of multiple content creators based on the attribution vector and based on identifying one or more of the multiple content creators that contributed at least a threshold amount during the training, wherein a particular creator having a contribution less than the threshold amount does not receive a creator attribution; and
initiating providing compensation to one or more of the multiple content creators based at least in part on the attribution determination;
wherein training the artificial intelligence to create the trained artificial intelligence comprises:
selecting a content creator from multiple content creators to create a selected content creator;
selecting a plurality of content items associated with the selected content creator to create selected content items;
training the artificial intelligence using the selected content items;
determining a number of activations caused to individual parameters of the artificial intelligence;
determining the relative contribution of the selected content items of individual content creators based at least in part on a change in parameters of the trained artificial intelligence caused by multiple content items with their respective activations;
determining a measure of a proximity between:
the artificial intelligence trained using the selected content items, and
the artificial intelligence prior to initiating the training;
determining a creator influence of the content creator on the trained artificial intelligence based at least in part on the measure of the proximity; and
including the creator influence in an attribution vector.

16. The non-transitory computer-readable memory device of claim 15, the operations further comprising:
while generating the output, determining:
activations of neural pathways in the trained artificial intelligence; and
an amount of individual activations.

17. The non-transitory computer-readable memory device of claim 16, further comprising:
after determining that the trained artificial intelligence has completed generating the output, creating a dynamic attribution vector based on the activations of the neural pathways and the amount of the individual activations, the dynamic attribution vector indicating an influence of the individual content creators on the output; and
creating the attribution vector based at least in part on the dynamic attribution vector.

18. The non-transitory computer-readable memory device of claim 15, wherein the training further comprises:
determining a content item influence of individual content items of the plurality of content items associated with the content creator using a converging function comprising a loss minimization algorithm that uses a direction and a learning rate to reduce a cost function close to zero.

19. The non-transitory computer-readable memory device of claim 15, wherein the training further comprises:
determining a contribution of individual content items of the selected content items associated with the selected content creator on gradients of the artificial intelligence during the training;
aggregating contributions of the selected content items; and
determining a contribution of the selected content creator based at least in part on the aggregating.

20. The non-transitory computer-readable memory device of claim 15, wherein the training further comprises:

determining a change caused by individual content items of the selected content items associated with the selected content creator to weights of the artificial intelligence during the training;

determining a number of activations caused by individual content items of the selected content items; and determining a contribution of the selected content creator based at least in part on the change to the weights and the number of activations.

\* \* \* \* \*